United States Patent
Forin

(10) Patent No.: US 6,594,701 B1
(45) Date of Patent: Jul. 15, 2003

(54) CREDIT-BASED METHODS AND SYSTEMS FOR CONTROLLING DATA FLOW BETWEEN A SENDER AND A RECEIVER WITH REDUCED COPYING OF DATA

(75) Inventor: Alessandro Forin, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/223,967

(22) Filed: Dec. 31, 1998

Related U.S. Application Data

(60) Provisional application No. 60/095,297, filed on Aug. 4, 1998.

(51) Int. Cl.[7] ............................................... G06F 15/16
(52) U.S. Cl. ........................................ 709/232; 709/231
(58) Field of Search ................................. 709/203, 232, 709/228, 231, 105, 224; 370/235, 234, 236, 398; 711/171; 710/56, 22

(56) References Cited

U.S. PATENT DOCUMENTS

| | | | |
|---|---|---|---|
| 5,187,790 A | 2/1993 | East et al. | |
| 5,239,635 A | 8/1993 | Stewart et al. | |
| 5,257,374 A | * 10/1993 | Hammer et al. | ............ 709/105 |
| 5,278,961 A | 1/1994 | Mueller | |

(List continued on next page.)

FOREIGN PATENT DOCUMENTS

| | | |
|---|---|---|
| EP | 674 414 | 9/1995 |
| EP | 0 902 355 | 1/2000 |
| GB | 1 595 740 | 8/1981 |
| WO | WO 98/30969 | 7/1998 |

OTHER PUBLICATIONS

Katevenis, Buffer Requirements of Credit–Based Flow Control when a Minimum Draining rate is Guaranteed, IEEE 1997.*

Kung et al, Client–Server Performance on Flow–Controlled ATM network: A Web Database of Simulation Results, IEEE 1997.*

(List continued on next page.)

Primary Examiner—Mark R. Powell
Assistant Examiner—Thong Vu
(74) Attorney, Agent, or Firm—Leydig, Voit & Mayer, Ltd.

(57) ABSTRACT

Methods and systems for controlling data flow between a sender and a receiver include communicating credit lists to the sender. The credit lists include credits indicative of receive buffer sizes accessible by the receiver and capable of receiving data. The sender transmits data packets to the receiver. The data packets are preferably no greater in size than the credits specified in the credit list. When the sender uses all of the credits, the sender preferably refrains from sending data packets to the receiver until the supply of credits is replenished by the receiver. Because data flow between the sender and the receiver is regulated using credits, the likelihood of data overflow errors is reduced and communication efficiency is increased.

12 Claims, 9 Drawing Sheets

U.S. PATENT DOCUMENTS

| | | | |
|---|---|---|---|
| 5,307,487 A | | 4/1994 | Taveres et al. |
| 5,432,784 A | | 7/1995 | Öezveren |
| 5,446,854 A | | 8/1995 | Khalidi et al. |
| 5,479,627 A | | 12/1995 | Khalidi et al. |
| 5,617,348 A | | 4/1997 | Maguire |
| 5,623,636 A | | 4/1997 | Revilla et al. |
| 5,664,106 A | * | 9/1997 | Caccavale .................... 709/224 |
| 5,682,553 A | * | 10/1997 | Osborne ...................... 710/56 |
| 5,701,432 A | | 12/1997 | Wong et al. |
| 5,732,405 A | | 3/1998 | Ho et al. |
| 5,799,195 A | | 8/1998 | Ross |
| 5,826,057 A | | 10/1998 | Okamoto et al. |
| 5,899,994 A | | 5/1999 | Mohamed et al. |
| 5,905,509 A | | 5/1999 | Jones et al. |
| 5,918,229 A | | 6/1999 | Davis et al. |
| 5,923,657 A | * | 7/1999 | Kozaki et al. .............. 370/398 |
| 5,924,098 A | | 7/1999 | Kluge |
| 5,946,711 A | | 8/1999 | Donnelly |
| 5,953,530 A | | 9/1999 | Rishi et al. |
| 5,956,756 A | | 9/1999 | Khalidi et al. |
| 5,968,128 A | * | 10/1999 | Lauck et al. ................ 709/232 |
| 5,983,332 A | | 11/1999 | Watkins |
| 5,991,797 A | | 11/1999 | Futral et al. |
| 5,999,518 A | * | 12/1999 | Nattkemper et al. ........ 370/258 |
| 6,009,269 A | | 12/1999 | Burrows et al. |
| 6,029,224 A | | 2/2000 | Asthana et al. |
| 6,047,283 A | | 4/2000 | Braun |
| 6,067,604 A | | 5/2000 | Ramachandran et al. |
| 6,078,994 A | | 6/2000 | Carey |
| 6,088,044 A | | 7/2000 | Kwok et al. |
| 6,092,170 A | | 7/2000 | Kori |
| 6,115,802 A | | 9/2000 | Tock et al. |
| 6,118,724 A | | 9/2000 | Higginbottom |
| 6,141,323 A | * | 10/2000 | Rusu et al. .................. 370/236 |
| 6,157,955 A | * | 12/2000 | Narad et al. ................ 709/228 |
| 6,167,402 A | | 12/2000 | Yeager |
| 6,167,465 A | * | 12/2000 | Parvin et al. .................. 710/22 |
| 6,226,267 B1 | * | 5/2001 | Spinney et al. ............. 370/235 |
| 6,249,819 B1 | * | 6/2001 | Hunt et al. .................. 709/232 |

OTHER PUBLICATIONS

Katevenis et al, Credit–Flow–Contrlled ATM for MP Interconnection: the ATLAS I Single Chip ATM Switch, IEEE Feb. 1998.*

Kant, Flow Control Mechanisms for SAAL Links, IEEE 1996.*

Welsh, M. et al., "Memory Management for User–Level Network Interfaces", *IEEE Micro*, vol. 18, No. 2, pp. 77–82, Mar. 1, 1998.

Blumrich M.A., et al., "Virtual Memory Mapped Network Interface for the SHRIMO Multicomputer", *Computer Architecture News*, vol. 22, No. 2, pp. 142–153, Apr. 1, 1994.

Nelson, Mark, *The Data Compression Book*, Chapter 11 "Lossy Graphics Compression", M&T Books, 1992 pp. 347–374.

Pennebaker, William B. and Mitchell, Joan, *JPEG Still Image Data Compression Standard*, Chapter 5 Image Compression Systems, Chapter 6 "JPEG Modes of Operation", and Chapter 7 "JPEG Syntax and Data Organization", Van Nostrand Reinhold, 1993, pp. 65–134.

Structured Computer Organization, pp. 308–341, Andrew S. Tanenbaum, © 1984 by Prentice–Hall, Inc., Englewood Cliffs, N. J. 07632.

Larson et al., LKRHash: Scalable Hash Tables, pp. 1–15, Draft Nov. 19, 1998.

Ryan et al., "SCI for Local Area Networks," Research Report 256, University of Oslo, Norway, pp. 1–18, Jan. 1998.

Ian Alexander Prat, "The User–Safe Device I/O Architecture," Dissertation, King's College, University of Cambridge, pp. 1–159, Aug. 1997.

Welsh et al., "Incorporating Memory Management into User–Level Network Interfaces," Department of Computer Science, Cornell University, pp. 1–10,1997.

Chen et al. "UTLB: A Mechanism for Address Translation on Network Interfaces," published in "Proceedings of the Eighth International Conference on Architectural Support for Programming Languages and Operating Systems" (APLOS VIII), vol. 33, No. 11, pp. 193–204, Oct. 1998.

"Windows* Sockets 2 Service Provider Interface," Revision 2.0.8, pp. 1–157, Jun. 30, 1995.

Li et al., "High–Performance Distributed Objects over a System Area Network," pp. 1–14, Dec. 14, 1998.

"Virtual Interface Architecture Specification," Draft Revision 1.0, pp. 1–83, Dec. 4, 1997.

Goodman et al., "Memory Systems," *The Electrical Engineering Handbook*, CRC Press, pp. 1927–37, 1993.

* cited by examiner

CREDIT-BASED METHODS AND SYSTEMS FOR CONTROLLING DATA FLOW BETWEEN A SENDER AND A RECEIVER WITH REDUCED COPYING OF DATA

This application claims the benefit of U.S. Provisional Patent Application No. 60/095,297 filed Aug. 4, 1998, the disclosure of which is incorporated herein by reference in its entirety.

TECHNICAL FIELD

The present invention relates to methods and systems for controlling data flow between sending and receiving processes executing on one or more computers. More particularly, the present invention relates to methods and systems for controlling data flow between a sender and a receiver, each including one or more computer processes, by communicating credits from the receiver to the sender indicating receive buffer sizes with reduced copying of data between sending and receiving applications.

BACKGROUND OF THE INVENTION

In computer communication systems, it is desirable to control the flow of data from a sending process to a receiving process. For example, if a sending process sends data to a receiving process faster than the receiving process can receive and process the data, data may be lost or overwritten. Similarly, if a sending process sends data and the receiving process fails to provide a buffer to receive the data, the connection between the sending and receiving processes may be broken.

In conventional flow control techniques, such as TCP flow control techniques, flow is regulated between TCP buffers at the transport level. More particularly, TCP protocol software may utilize a sliding window to control flow between a sender's TCP buffer and a receiver's TCP buffer. According to TCP flow control, the sender maintains one window to monitor data segments that have been sent to the receiver and acknowledged, data segments that have been sent and not acknowledged, and data segments that have not been sent. The receiver maintains a similar window to reassemble the data in the receiver's TCP buffer. When a receiving application reads data from the receiver's TCP buffer, the data is copied from the receiver's TCP buffer to an application-level receive buffer and new data can be received in the TCP buffer. Thus, in order to regulate flow between a TCP sender and a TCP receiver, it is only necessary that the receiver communicate the size of the TCP buffer to the sender, rather than the size of the application-level buffers.

The communication of the TCP buffer size to a TCP sender is accomplished through acknowledgement packets sent from the receiver to the sender. Each acknowledgement packet acknowledges a specific data segment sent from the sender to the receiver. Each acknowledgement includes a size field advertising the size of the receiver's TCP buffer to the sender. The sender adjusts its window according to the advertised size and sends no more data than the current window size permits. Thus, once the sender fills the current window and sends the data to the receiver, the sender waits for acknowledgement packets from the receiver indicating that the receiver's TCP buffer has been emptied and more data can be sent. This waiting may be undesirable, since the acknowledgement packets may be delayed due to network congestion.

Another problem with conventional TCP flow control methods is that the TCP buffer size information communicated by a TCP receiver may not reflect the actual available TCP buffer size. For example, conventional TCP protocol software may advertise to the sender an upper limit on the number of bytes that a TCP buffer is capable of receiving. This upper limit may not reflect the actual memory space reserved for the TCP buffer when data arrives from the sender. Thus, conventional flow control methods may not communicate accurate buffer size information to the sender.

Yet another problem with TCP flow control methods is that the copying of data between the TCP buffers and the sending and receiving application buffers introduces latency into data transfers. As a result of this latency, these methods may not be feasible in high-speed environments, such as system area networks (SANs). For example, in TCP, data may be copied from a sender's application-level buffer to the sender's TCP buffer and from a receiver's TCP buffer to the receiver's application-level buffer. This copying may have a significant impact on I/O performance in high-speed environments.

In order to increase I/O performance over conventional communications protocols, some communication protocols, such as the Virtual Interface Architecture (VIA), do not buffer data for an application or perform fragmentation and reassembly of data. Data is sent from a sending I/O device, over a network, and received directly into an application-level receive buffer of a receiver. If a sender utilizing the VIA architecture attempts to send data when a receive buffer is not available, connection between the sender and receiver is broken. The breaking of a connection is a catastrophic, unrecoverable error, that requires reestablishment of the connection and resending of the data. Similarly, when a sender utilizing VIA sends more data than a receive buffer can hold, or a larger buffer than the maximum transfer unit (MTU) of the network, connection may also be broken. When a sender sends an amount of data smaller than the size of a receive buffer, communication is not broken. However, sending less data than the receiver is capable of receiving may be inefficient. TCP flow control methods may be unsuitable for solving these problems because of the latency introduced by copying, fragmentation, and reassembly, and because TCP flow control methods are based on TCP buffer size, rather than application buffer size. Thus, there exists a need for methods and systems for controlling flow between a sender and a receiver that alleviate the difficulties with conventional flow control techniques.

SUMMARY OF THE INVENTION

The present invention includes methods and systems for controlling flow of data over a connection, preferably a reliable connection, between a sender and a receiver, while reducing the need for copying of data. As used herein, the term "sender" is intended to refer to one or more processes that communicate with a receiver, which also includes one or more processes. The sender and the receiver may execute on the same computer or on separate computers. The terms "sender" and "receiver" are not intended to include or be limited to any specific hardware configuration or to processes capable of only sending or only receiving data. For example, both a sender and a receiver may be capable of sending and receiving data.

According to one aspect, the invention includes a method for controlling flow of from a send buffer associated with a sender to a receive buffer associated with a receiver. In a preferred implementation of the invention, the only copy of the data made between the send buffer and the receive buffer may be the signal transmitted over the communication link between the sender and the receiver. Copying of data increases time required to process an I/O request. Thus, reducing the number of copies between the send buffer and the receive buffer increases transmission efficiency.

In order to control the flow of data without copying the data, the receiver may communicate application-level receive buffer sizes to the sender. The receiver preferably communicates the buffer size information to the sender in an efficient manner. For example, the more buffer size information communicated to the sender in each flow control communication, the more efficient the communication process. In one implementation, the receiver may communicate a list containing at least one application-level receive buffer size to the sender, so that the sender can determine how much data the receiver is capable of receiving. In preferred implementations of the invention, the receiver may send a list containing a plurality of application-level receive buffer sizes to the sender. One method for communicating the list of buffer sizes to the sender is by sending a message, e.g., a packet, from the receiver to the sender over a data channel established between the sender and the receiver. The message may contain the list of receive buffer sizes, and is hereinafter referred to as a credit message. The receive buffer sizes in the credit message are hereinafter referred to as credits.

The sender may utilize the credits in the credit message to determine the size and order of data packets to be sent to the receiver. For example, the sender preferably does not exceed the size indicated by a particular credit or send data when no credits are available. In addition, the sender preferably uses the credits in the order that the credits are received from the receiver, so that the receiver can receive data into the correct buffers. Because the credits are preferably indicative of application-level receive buffer sizes, the data sent by the sender can be received directly into allocated application-level receive buffers. Thus, the credit-based flow control methods and systems according to the invention provide both reliable and efficient data transfer between senders and receivers.

Another method for communicating credits to the sender is using shared memory. For example, the sender and the receiver may each comprise a process or processes executing on the same machine or on different machines that utilize shared memory to communicate with each other. The shared memory may include a control portion and a data portion. In order to control flow, the receiver may write credits to the control portion indicative of receive buffer sizes in the data portion available for receiving data. The sender may read the credits in the control portion to determine how to partition data being sent.

Still another method for communicating credits to the sender is a remote direct memory access (RDMA) write operation. In RDMA write operations, the receiver may send a list of credits directly to the memory of a remote machine on which the sender executes. The sender may poll the memory location or locations of the buffer that receives RDMA transfers to determine when credits are available. Alternatively, the sender may be notified asynchronously of the arrival of credits in the RDMA buffer. The sender may use the credits in the manner previously described to determine how to partition and send data to the receiver.

In implementations of the invention where credit messages are used to deliver credits to the sender, the credit messages may be delivered using a new protocol or by extending an existing protocol. For example, in a new protocol, the sender and the receiver may exchange credit messages over a control channel established exclusively for the exchange of credit messages. In order to extend an existing protocol, credits may be communicated to the sender using optional data fields in the existing protocol. For example, in TCP, credits may be communicated to the sender using the OPTIONS field in any TCP packet, such as a TCP acknowledgment packet. The TCP sender may then send data to the receiver having lengths corresponding to the credits.

According to another aspect, the present invention may include methods and systems for determining when to communicate credits to a sender. The receiver preferably communicates credits to the sender in a timely manner. For example, if the sender has data to be sent and the receiver fails to timely notify the sender of the available receive buffer space, sending may be delayed. In order to avoid delays in sending, the receiver may monitor credits sent to the sender, the rate at which the sender uses the credits, and/or when the sender uses particular credits in a credit list previously communicated to the sender. Based on the monitored information, the receiver may determine when to communicate new credits to the sender to avoid the condition where the sender has data to send but has no credits. For example, the receiver may communicate new credits to the sender after receiving data from the sender into a first receive buffer specified in a credit list previously communicated to the sender. In another alternative, the receiver may communicate a new credit list to the sender when the receive buffer corresponding to a buffer size near the end of the previous credit list receives data from the sender. In yet another alternative, new credits may be communicated to the sender when a receive buffer between the first and last buffers in the previous credit list receives data from the sender.

Since credits may be received in a finite-sized buffer managed by the sender, the flow of credits from the receiver to the sender is preferably controlled. In order to control credit flow, the receiver may utilize the receipt of data from the sender as an indication that there is a buffer available to receive new credits. For example, the sender preferably only sends data to the receiver when the sender has been notified through a credit list that a receive buffer is available. Thus, when the receiver receives data from the sender, the receiver knows that a previous credit list has been successfully communicated to the sender. When the sender receives new credits from the receiver, the sender preferably posts a new receive buffer to receive additional credits. The sender is preferably prevented from using credits in the new credit list until the buffer for receiving the next credit list is posted. Thus, when the receiver receives data from the sender corresponding to the first credit in a new credit list, the receiver also knows that a buffer for receiving additional credit lists is available. One additional assumption made by the receiver is that the sender initially, i.e., before any credit messages or data is transferred, has at least one buffer available for receiving credit lists. Finally, the size of the credit list is preferably no greater than the size of the sender's credit list buffer or the network MTU between the sender and receiver, whichever is smaller. Thus, based on these rules, the present invention reliably implements flow control of credits.

According to another aspect, the present invention includes a method for controlling data flow between a sender and a receiver. The method includes communicating a first credit list to a sender. The first credit list may include a plurality of credits indicative of buffer sizes of receive buffers accessible by the receiver and capable of receiving data from the sender. In response to receiving the first credit list, the sender transmits a data packet to the receiver. The data packet is no greater in size than a first buffer size specified by a first credit in the first credit list.

According to another aspect, the present invention includes a credit list builder/communicator including computer-executable instructions embodied in a computer-readable medium for performing steps. The steps may include receiving requests for receiving data into a plurality of receive buffers accessible by a receiver and capable of receiving data from a sender. In response to the requests, the credit list builder/communicator may build a credit list including a plurality of credits indicative of sizes of a plurality of receive buffers. After building a credit list, the credit list builder/communicator may communicate the credit list to the sender.

According to another aspect, the present invention may include a data structure for controlling data flow between a sender and a receiver. The data structure may include a credit list including a plurality of credits. Each credit in the credit list is indicative of a buffer size of a receive buffer accessible by a receiver and capable of receiving data from a sender.

According to another aspect, the present invention may include a credit list reader/processor including computer-executable instructions embodied in a computer-readable medium for performing steps. The steps may include posting a first buffer for receiving credits from a receiver. The credit list reader/processor may determine whether credits have been received in the first buffer, and, in response to receiving credits in the first buffer, the credit list reader/processor may post a second buffer for receiving additional credits. After posting the second buffer, the credit list reader/processor may store credits from the first buffer in a credit list.

According to another aspect, the present invention may include a credit list builder/communicator including computer-executable instructions embodied in a computer-readable medium for performing steps for determining when to communicate additional credits messages to a sender. The steps may include communicating a first credit list to a sender. The credit list builder/communicator may then determine if data has been received in a first buffer corresponding to a first credit in the first credit list. In response to determining that data has been received in the first buffer, the credit list builder/communicator may communicate a second credit list to the sender.

According to another aspect, the present invention may include a credit list builder/communicator including computer-executable instructions for performing steps for determining when to communicate new credits to a sender. The steps may include communicating a first credit list to a sender. After communicating the first credit list to the sender, the credit list builder/communicator may monitor the frequency at which the sender consumes credits in the first credit list. The credit list builder/communicator may determine when to communicate a second credit list to the receiver based on the frequency. For example, the credit list builder/communicator may determine a triggering buffer corresponding to a credit in the first credit list based on the frequency. The credit list builder/communicator may instruct an input/output device to send the second credit message to the sender when the triggering buffer receives data. In an alternative arrangement, rather than determining a triggering buffer, the credit list builder/communicator may determine a time in time units, such as milliseconds, for determining when to send a new credit message to the sender, based on the frequency.

According to another aspect of the invention, the receiver may utilize credits to implement quality of service features. For example, the receiver may be a server that provides services to a plurality of client senders. Since the server may concurrently receive data from multiple clients, it may be desirable for the server to impose a maximum allowable bandwidth restriction on each clients, to prevent the server from being overrun with data. One way that the sender may control the bandwidth is by regulating the number of unused credits available to each client so that no client has enough credits to exceed the maximum allowable bandwidth. By using available credits to regulate maximum bandwidth for each client, the server maintains a given quality of service for all clients.

According to another aspect, the present invention may include a credit list builder/communicator including computer-executable instructions embodied in a computer-readable medium for performing steps. The steps may include operating in a first mode for determining when to communicate new credits to a sender. The credit list builder/communicator may receive in-band information from the sender and analyze the in-band information. If the in-band information indicates that switching would increase I/O performance, the credit list builder/communicator may switch to a second mode for determining when to communicate new credits to the sender.

According to another aspect, the present invention may include an input/output device. The input/output device may include a processing circuit and a memory device coupled to the processing circuit. For example, the processing circuit may comprise a microprocessor and the memory device may comprise on-chip memory of the microprocessor. Alternatively, the memory device may comprise a memory chip external to the chip containing the processing circuit. The memory device may comprise a general-purpose memory, such as a read-only memory that stores computer-executable instructions. Alternatively, the memory device may comprise an application specific integrated circuit that implements the computer-executable instructions in hardware. The computer-executable instructions included in or implemented by the memory device may perform steps. The steps may include receiving requests for receiving data into receive buffers stored in virtual memory locations of a host computer connectable to the input/output device. The next step may include building a credit list including a plurality of credits indicative of sizes of the receive buffers. Finally, after building the credit list, the next step may include communicating the credit list to the sender.

According to another aspect, the present invention may include an input/output device. The input/output device may include a processing circuit and a memory device, as previously described. The computer-executable instructions included in or implemented by the memory device may perform steps. The steps may include posting a first buffer accessible by a sender for receiving credits from a receiver. The next step may include determining whether credits have been received in the first buffer. In response to receiving credits in the first buffer, the next step may include posting a second buffer accessible by the sender for receiving additional credits from the receiver. After posting the second buffer, the next step may include storing credits from the first buffer in a credit list.

According to another aspect, the present invention may include a network communications system. The network communication system may include a first local virtual interface, a second local virtual interface, and a credit list builder/communicator. The first local virtual interface may send data to and receive data from a first remote virtual interface over a first network connection. The second local virtual interface may send credit messages to and receive credit messages from a second remote virtual interface over a second network connection. The credit list builder/communicator may build credit messages for controlling data flow over the first network connection and communicate the credit messages to the second remote virtual interface through the second local virtual interface and the second network connection. The credit messages may include credit lists including a plurality of credits indicative of buffer sizes of receive buffers for receiving data through the first local virtual interface from the first remote virtual interface. Alternatively, each virtual interface may be used to communicate data in one direction while communicating credit messages in the reverse direction.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages may be best understood from the following detailed description taken in conjunction with the accompanying drawings of which:

SPECIFIC DESCRIPTION OF THE INVENTION

Figure 1:
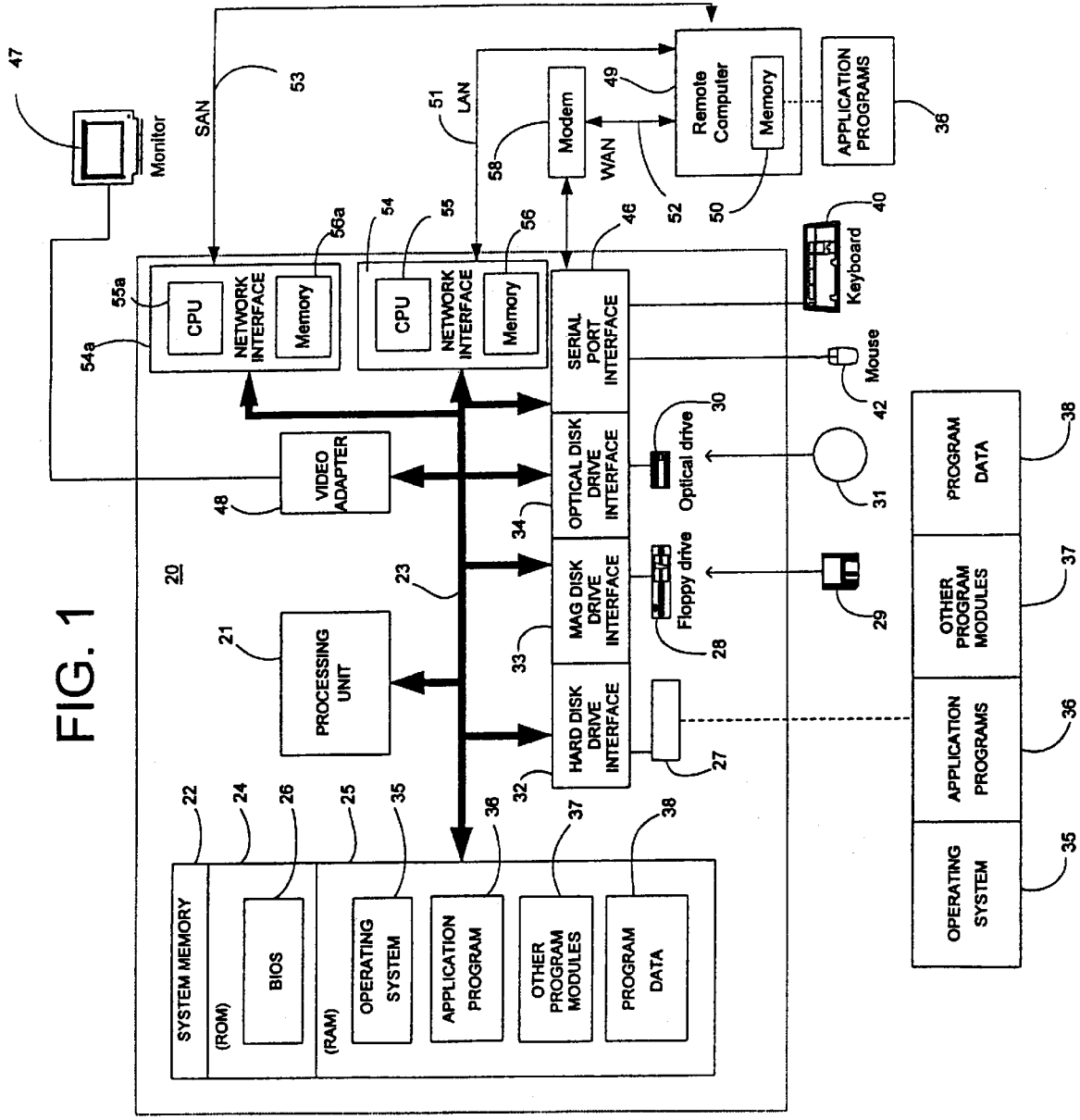
FIG. 1 is a block diagram generally illustrating an exemplary computer system on which embodiments of the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. The operating system 35 may include a virtual memory manager and one or more I/O device drivers that communicate with each other to maintain coherence between virtual memory address mapping information stored by the operating system 35 and virtual memory mapping information stored by one or more I/O devices, such as network interface adapters 54 and 54a. A user may enter commands and information into the personal computer 20 through input devices such as a keyboard 40 and a pointing device 42.

Other input devices (not shown) may include a microphone, touch panel, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51, a wide area network (WAN) 52, and a system area network (SAN) 53. Local- and wide-area networking environments are commonplace in offices, enterprise-wide computer networks, intranets and the Internet. System area networking environments are used to interconnect nodes within a distributed computing system, such as a cluster. For example, in the illustrated embodiment, the personal computer 20 may comprise a first node in a cluster and the remote computer 49 may comprise a second node in the cluster. In such an environment, it is preferable that the personal computer 20 and the remote computer 49 be under a common administrative domain. Thus, although the computer 49 is labeled "remote", the computer 49 may be in close physical proximity to the personal computer 20.

When used in a LAN or SAN networking environment, the personal computer 20 is connected to the local network 51 or system network 53 through the network interface adapters 54 and 54a. The network interface adapters 54 and 54a may include processing units 55 and 55a and one or more memory units 56 and 56a. The memory units 56 and 56a may contain computer-executable instructions for processing I/O requests including translating virtual memory addresses to physical memory addresses, obtaining virtual address mapping information from the operating system 35, and recovering from local address translation failures. The memory units 56 and 56a may also contain page tables used to perform local virtual to physical address translations.

When used in a WAN networking environment, the personal computer 20 typically includes a modem 58 or other means for establishing communications over the WAN 52. The modem 58, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

When used in any of the networking environments illustrated in FIG. 1, data flow is preferably regulated between processes executing on the personal computer 20 and processes executing on the remote computer 49 that communicate with each other. For example, the personal computer 20 may include a sender for sending data through one of the network interface adapters 54 and 54a to a receiver executing on the remote computer 49. Accordingly, in order to regulate data flow between the sender and the receiver, the sender may include a credit list reader/processor for receiving and processing credits from the receiver. The receiver may include a credit list builder/communicator for building credit lists and communicating the credit lists to the sender.

The present invention is not limited to regulating flow between processes executing on separate computers. The credit list builder/communicator and the credit list reader/processor may be used to regulate flow between a sender and a receiver executing on the same machine. For example, the sender and the receiver each may comprise an application program executing on the personal computer 20 that utilize a shared memory region for communicating with each other. The shared memory region may include a data portion and a control portion. In order to regulate flow, the credit list builder/processor of the receiver may write credits to the control portion of the shared memory region. The credits may be indicative of receive buffer sizes in the data portion of the shared memory region. In order to access the credits, the credit list reader/processor of the sender may read the control portion of the shared memory region. The credit list reader/processor preferably uses the credits in the order that the credits are made available, preferably does not exceed the buffer size indicated by each credit, and preferably only writes data to the data portion when credits are available. In this manner, flow between the sender and the receiver may be regulated using credits in shared memory.

In yet another alternative, where the sender and receiver are executing on different machines, RDMA write operations may be used to communicate credits from the receiver to the sender. In RDMA write operations, the credit list builder/communicator of the receiver may write credits directly to the memory of the machine on which the credit message reader processor of the sender executes. In order to perform an RDMA write operation, the credit list builder/communicator may construct a packet containing a list of credits and the destination memory address of the sender where the credits will be stored. The sender may receive the packet directly into the specified memory address. In order to use the credits, the credit list reader/processor may read the memory location that receives the RDMA packet. The credit list reader/processor may use the credits to send data to the receiver in the manner previously described. Thus, RDMA write operations provide yet another mechanism for communicating credits to the sender.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer and/or the processing units of I/O devices of electrical signals representing data in a structured form. This manipulation transforms the data or maintains it at locations in the memory system of the computer and/or the memory systems of I/O devices, which reconfigures or otherwise alters the operation of the computer and/or the I/O devices in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the acts and operations described hereinafter may also be implemented in hardware.

Figure 2:
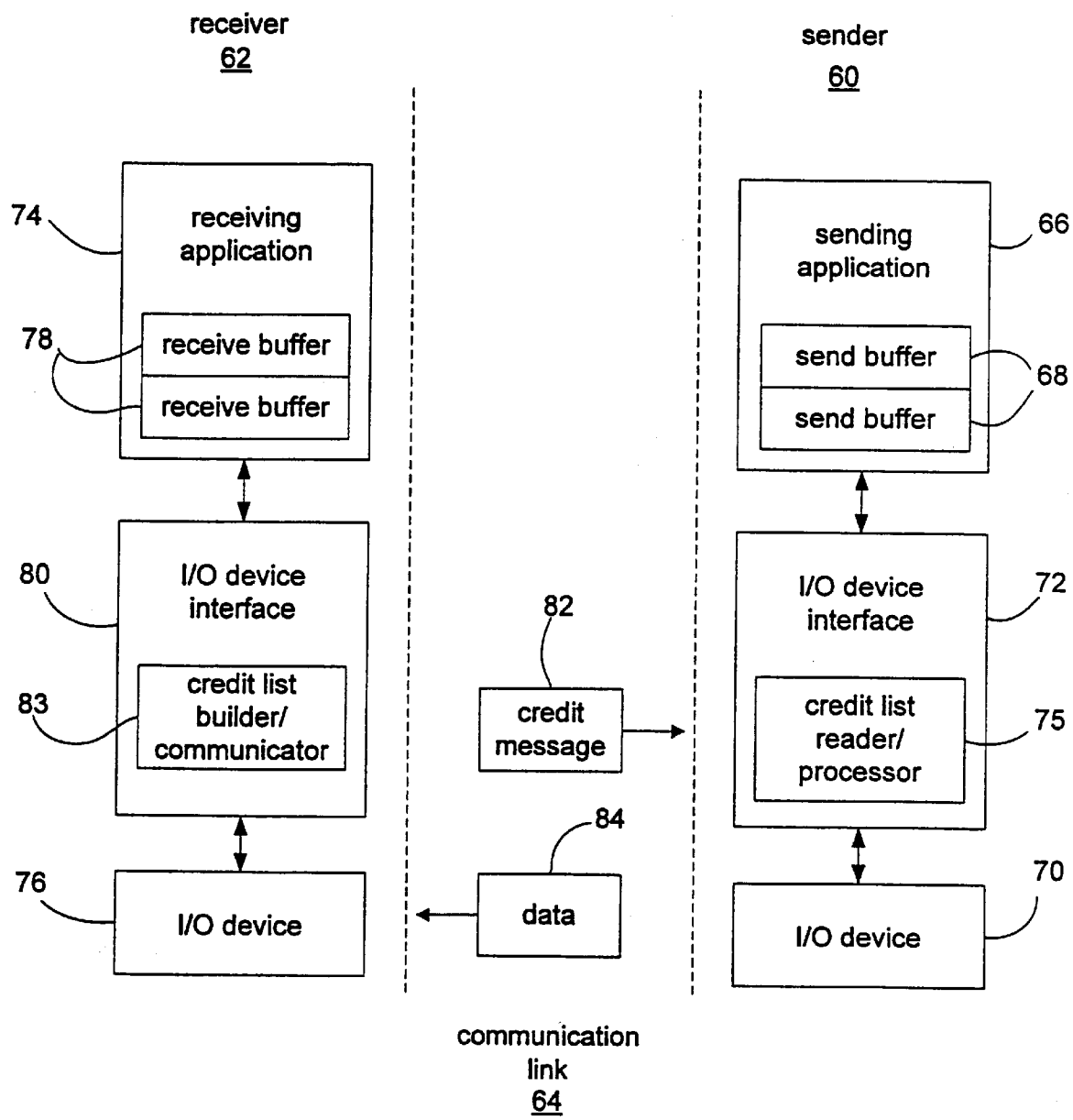
FIG. 2 is a block diagram illustrating a sender and a receiver including a system for controlling data flow according to an embodiment of the present invention.

FIG. 2 illustrates an exemplary sender 60 and a receiver 62 including a system for controlling data flow according to an embodiment of the present invention. In the illustrated embodiment, the sender 60 and the receiver 62 may each comprise a plurality of processes executing on the same computer or on different computers that communicate over a communication link 64. The communication link 64 may comprise a LAN, a WAN, a SAN, or any other medium for transferring signals between connected devices. If the sender and the receiver include application programs executing on the same machine, the communication link may comprise a bus, such as a data bus. The sender 60 may include a sending application 66 for requesting the sending of data stored in one or more send buffers 68 from an I/O device 70 to other applications. For example, the sending application 66 may comprise a web server that sends data to other applications, such as the receiving application 74 over the communication link 64. The I/O device 70 may comprise any type of device for sending and receiving data in response to requests from an application. For example, the I/O device 70 may comprise a network interface adapter, such as an Ethernet adapter. In order to reduce copying of data between the sending application 66 and the I/O device 70, the I/O device 70 is preferably capable of translating virtual memory addresses of data to be sent to physical memory addresses. Exemplary mechanisms for translating virtual memory addresses to physical memory addresses are described in U.S. Pat. No. 6,321,276, "Recoverable Methods and Systems for Processing Input/Output Requests Including Virtual Memory Addresses," the disclosure of which is incorporated herein by reference in its entirety.

The sender 60 may also include an I/O device interface 72 for controlling communication between the sending application 66 and the I/O device 70. For example, the I/O device interface 72 may include communications functions, such as sockets, MPI, and cluster functions that may be called by the sending application when requesting sending of data. The I/O device interface 72 may convert the requests into data structures recognizable by the I/O device 70. In order to reduce the copying of data between the sending application 66 and the I/O device 70, the I/O device interface 72 may also include memory registration functions for registering memory used by applications with the I/O device 70. However, because the I/O device 70 is preferably capable of recovering from local virtual address translation failures, memory registration may not be required.

The receiver 62 may include the receiving application 74 for requesting receipt of data from an I/O device 76 into one or more receive buffers 78. For example, the receiving application 74 may comprise a web browser that receives data sent over a network from other applications, such as the sending application 66. The I/O device 76 of the receiver may comprise any device capable of sending and receiving data over a communication link in response to requests from the receiving application 74. The receiver 62 preferably also includes an I/O device interface 80 for controlling communication between the receiving application 74 and the I/O device 76. The I/O device 76 and the I/O device interface 80 may be similar in structure to the I/O device 70 and the I/O device interface 72 of the sender and need not be further described.

According to an important aspect of the invention, the receiver 62 communicates credits to the sender 60 to control the flow of data packets 84 sent by the sender 60. In the illustrated embodiment, communicating the credits to the sender includes sending credit messages 82 to the sender. The credit messages may be variously configured. In a preferred embodiment, the credit messages may include credit lists containing buffer size information relating to the size of one or more receive buffers 78 in which the receiving application 74 may request receipt of data. In order to generate credit lists and communicate credits to the sender, the receiver may include a credit list builder/communicator 83. When the receiving application requests receipt of data into one or more of the receive buffers 78, e.g., by communicating the buffer virtual addresses and sizes to the I/O device interface 80, the credit list builder/communicator 83 may generate credit messages including the sizes of the receive buffers 78 and forward the credit messages to the I/O device 76 to be sent to the sender 60. Alternatively, the credit list builder/communicator may communicate credits to the sender using a shared memory buffer or through RDMA write operations, as previously described. The credit list builder/communicator 83 may also determine when to communicate new credits to the sender 60. Methods for determining when to communicate new credits to the sender 60 are discussed in more detail below.

In order to process the credits received from the receiver, the sender may include a credit list reader/processor 75. The credit list reader/processor 75 may be variously configured. For example, the credit list reader/processor 75 may receive credit messages 82 from the receiver 62 and extract credits including buffer size information from the credit messages. Alternatively, when the receiver communicates credits to the sender using a shared memory region or an RDMA write operation, the credit message reader/processor may read data from the shared memory region or the buffer for receiving RDMA writes.

According to an important aspect of the invention, the credit list reader/processor 75 preferably uses the credits to determine the size of data packets to be sent to the receiver. In addition, the credit list reader/processor preferably uses the credits in the order that the credits were received, so that the receiver will receive data in the correct buffers. For example, the credit message 82 may indicate that the receiving application 74 has a first buffer of four bytes for receiving data and a second buffer of two bytes for receiving data. The sending application 66 may have a send buffer of six bytes to be sent to the receiving application. Under these conditions, the credit list reader/processor 75 may request that the I/O device 70 send a first data packet of four bytes and a second data packet of two bytes to the receiver 62, e.g., by communicating the virtual addresses of the data to be sent along with the appropriate sizes to the I/O device 70. The credit list reader/processor 75 preferably maintains a list of credits received from the receiver 62 and removes credits from the list as the sender uses the credits. Thus, because the receiver 62 preferably communicates credits indicative of application buffer sizes to the sender, and the sender 60 constructs data packets having sizes based on the credits, data flow between the sender and the receiver may be efficiently regulated. Moreover, software copying, segmentation, and reassembly of data may not be required according to preferred implementations of the invention because the data packets sent to the receiver are preferably no greater in size than the corresponding receive buffers.

In order to communicate credit messages to the sender, the credit list builder/communicator may utilize the same connection or a separate connection from the connection used for receiving data from the sender. In a preferred embodiment, the sender and the receiver send and receive data over one or more data connections and exchange credit messages over a control connection separate from the data connections. When the sender and the receiver communicate over multiple data connections, the credit message builder/communicator may multiplex credits or credit messages transmitted over the control connection. Each credit or credit message in the multiplexed control channel may indicate the data connection to which it pertains. Thus, the methods for controlling data flow according to the present invention are applicable to a single data connection or to a plurality of data connections. The credit message reader/processor of the sender may demultiplex the credit messages on the control channel and use the credits in the credit messages to send data over the corresponding data connections. In order to prevent credit message overflow on the control connection, the credit message reader/processor preferably maintains a credit message buffer for each data connection.

In yet another alternative embodiment, the receiver may communicate with a plurality of senders. For example, the sender may comprise a server and the receivers may comprise clients. In such an embodiment, the credit message builder/communicator of the receiver may receive data from a plurality of client senders utilizing a separate data connection for each sender. The credit message builder/communicator of the receiver may communicate credits to each sender utilizing a separate control connection for each sender.

The credit message builder/communicator and the credit message reader/processor may be implemented in hardware, software, or a combination of hardware and software. For example, in the embodiment illustrated in FIG. 2, the credit message builder/communicator and the credit message reader processor may be components of the communications provider software included in the I/O device interfaces 72 and 80. In an alternative embodiment, the credit message builder/communicator and the credit message reader/processor may be implemented in hardware of the I/O devices 70 and 76. Implementing the credit message builder/communicator and the credit message receiver/processor in the hardware of the I/O devices allows flow control to be performed transparently to the communications provider software.

Although the embodiment illustrated in FIG. 2 shows a sender 60 and a receiver 62 respectively having a credit list reader/processor 75 and a credit list builder/communicator 83, the present invention is not intended to be limited to such an embodiment. For example, the sender 60 and the receiver 62 may each be capable of sending and receiving data. Thus, the I/O device interface 72 of the sender 60 may include a credit list builder/communicator 83 in addition to the credit list reader/processor 75. Similarly, the I/O device interface 80 of the receiver 62 may include a credit list reader/processor 75 in addition to the credit list builder/communicator 83.

Figure 3:
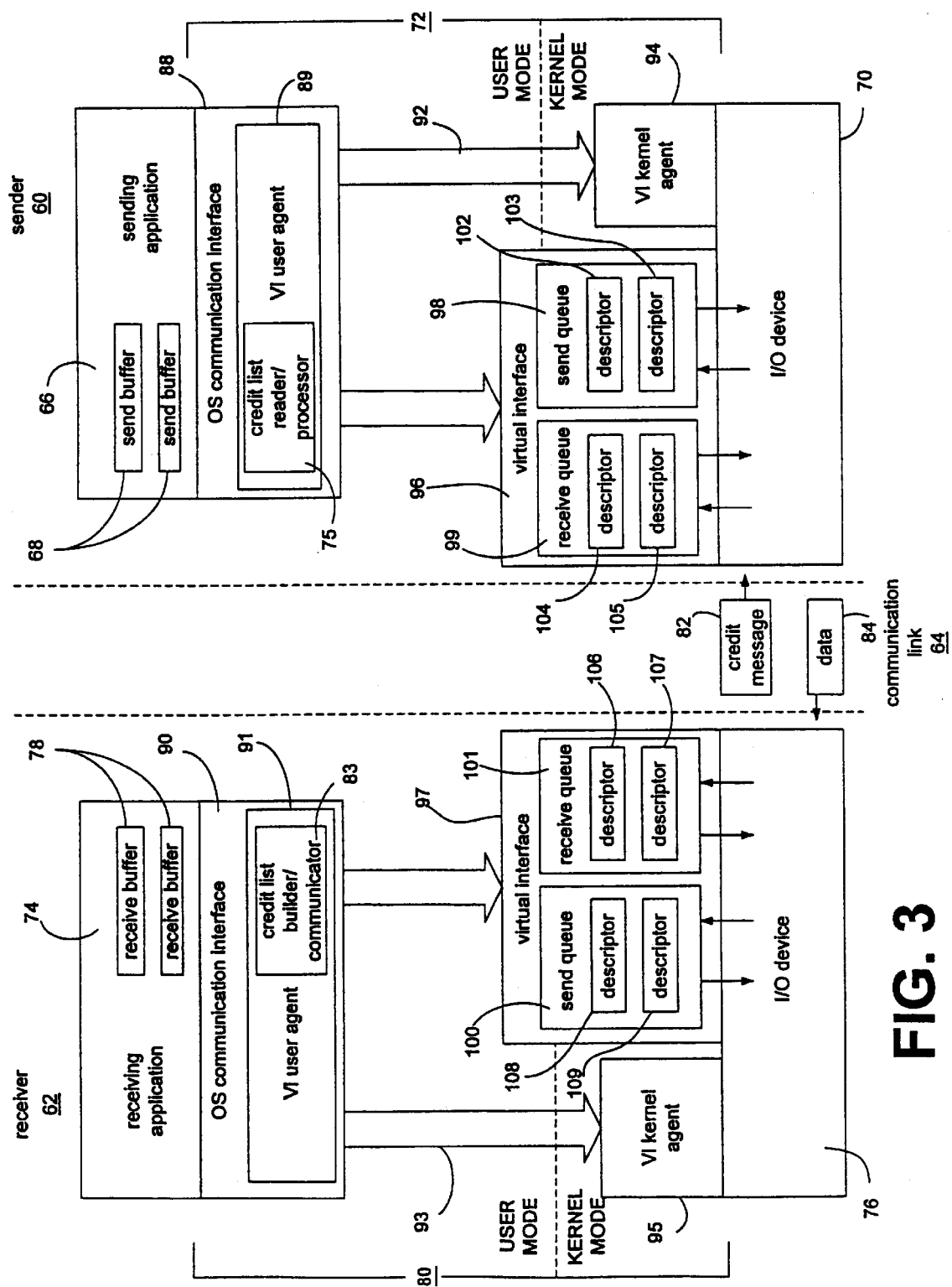
FIG. 3 is a more detailed block diagram of the sender and the receiver including the system for controlling data flow according to the embodiment of FIG. 2.

FIG. 3 is a more detailed block diagram of the sender 60 and the receiver 62 illustrated in FIG. 2. The sender 60 and the receiver 62 illustrated in FIG. 3 preferably implement the Virtual Interface Architecture (VIA). According to the VIA architecture, the efficiency of I/O operations may be increased by granting I/O devices direct access to application-level data buffers so that copying of data between applications and the I/O devices is not required. In order to provide I/O devices direct access to application-level buffers, the I/O device interfaces 72 and 80 communicate descriptors to the I/O devices. A descriptor is a data structure containing I/O request processing information, such as the virtual memory address and size of a send or receive buffer. The I/O devices translate the virtual memory addresses in the descriptors to physical memory addresses and either send data from or receive data into a buffer at the physical memory address. The buffer size information in the descriptors may also be used by the credit list builder/communicator 83 to generate credit messages.

In FIG. 3, the I/O devices 70 and 76 preferably each comprise a VIA network interface adapter capable of sending and receiving data and credit messages over the communication link 64. A VIA network interface adapter may comprise any type of network adapter capable of high-speed communications, for example, an Ethernet card, such as a gigabit Ethernet card. In addition, the VIA network interface adapter is preferably capable of translating virtual memory addresses of buffers used in I/O operations into physical memory addresses.

The I/O device interfaces 72 and 80 of the sender 60 and the receiver 62 each comprise a plurality of components for controlling communications between the applications 66 and 74 and the I/O devices 70 and 76. For example, the I/O device interface 72 of the sender 60 may include an operating system communication interface 88 and a virtual interface (VI) user agent 89. The I/O device interface 80 of the receiver 62 may also include an operating system communication interface 90 and a VI user agent 91. The operating system communication interfaces 88 and 90 and the VI user agents 89 and 91 of both the sender and the receiver may convert requests from the sending and receiving applications into data structures, such as descriptors, for processing by the I/O devices 70 and 76. Accordingly, the operating system communication interfaces 88 and 90 may include standard communications functions for performing network I/O, such as sockets, MPI, cluster, or other communications functions. The VI user agents 89 and 91 may communicate memory registration requests through communication links 92 and 93 to VI kernel agents 94 and 95. The VI kernel agents 94 and 95 may be components of the operating systems of the sender and the receiver that function as device drivers for the I/O devices 70 and 76. The VI kernel agents 94 and 95 may receive the memory registration requests from the VI user agents 89 and 91 and register memory used by the sending and receiving applications 66 and 74 with the I/O devices 70 and 76. In addition, the VI kernel agents 94 and 95 may establish and break connection with remote machines. The VI kernel agents 94 and 95 may also manage one or more virtual interfaces, such as virtual interface 96 of the sender 60 and virtual interface 97 of the receiver 62.

The virtual interfaces 96 and 97 may comprise communication interfaces between the sending and receiving applications 66 and 74 and the I/O devices 70 and 76. The virtual interface 96 of the sender 60 may include a send queue 98 and a receive queue 99. Similarly, the virtual interface 97 of the receiver 62 may include a send queue 100 and a receive queue 101. In order to request an I/O operation, the sending and receiving applications 66 and 74 may execute standard I/O commands, such as Winsock send( ) and Winsock recv( ). In response to these commands, the VI user agents 89 and 91 may post descriptors 102–109 to the send and receive queues of the sender and the receiver and notify the I/O devices of the posting of the descriptors. Posting the descriptors may include writing pointers to the virtual memory addresses of the descriptors to the virtual memory addresses of the queues. Notifying the I/O devices of the descriptors may include writing doorbell tokens including the virtual memory addresses of the descriptors to virtual memory addresses of doorbells associated with each queue. The VI kernel agents may map the virtual memory addresses of the doorbells to physical memory addresses of doorbell control registers associated with the I/O devices. When the I/O devices 70 and 76 receive doorbell tokens, the devices preferably increment a descriptor counter for the associated queue. The I/O devices 70 and 76 decrement the counters when descriptors are processed. The I/O devices 70 and 76 preferably process the descriptors in the order that the descriptors are posted in the send and receive queues and perform the requested I/O operations. The I/O devices preferably process the descriptors until the queues are empty or until an unrecoverable error occurs.

In order to request the sending of data, the sending application 66 may transmit a request for sending data to the VI user agent 89, which posts descriptors 102 and 103 in the send queue 98 of the sender virtual interface 96 and rings the doorbell of the send queue 98 once for each descriptor. The descriptors 102 and 103 may specify the virtual memory addresses of send buffers 68 containing data to be sent to the receiver. Once the descriptors are posted in the send queue 98, the I/O device 70 of the sender preferably locates the data at the virtual memory addresses indicated in the descriptors and sends the data to the receiver.

In order to receive data from the sender, the receiving application 74 preferably sends receive data requests to the VI user agent 91, which posts descriptors 106 and 107 in the receive queue 101 specifying one or more receive buffers 98 to store data from the sender. However, if no descriptors are posted in the receive queue 101 when the data arrives, connection between the sender and receiver may be broken. Similarly, because the receiver may not perform segmentation or reassembly of data, if data in a given data packet from the sender exceeds the size of the receive buffer in the descriptor 107 at the head of the receive queue 101, connection may also be broken. Accordingly, it is desirable to coordinate posting of descriptors in the send queue 98 of the sender with the posting of descriptors in the receive queue 101 of the receiver; i.e., it is desirable to control flow between the sender and the receiver.

In order to control flow between the sender 60 and the receiver 62, the credit list builder/communicator 83 builds credit messages based on sizes of the receive buffers contained in receive data requests initiated by the receiving application 74. For example, when the receiving application posts a descriptor in the receive queue, the credit list builder/communicator 83 may record the size of the buffer specified by the descriptor in a credit message. The credit list builder/communicator 83 may repeat this process for each descriptor posted in the receive queue. When the number of credits in the receive queue reaches a predetermined value or when the credit list builder/communicator 83 determines that the sender needs credits, the credit list builder/communicator 83 preferably requests that the I/O device 76 send a credit message 82 to the sender. Methods for determining when the sender needs credits will be discussed in more detail below.

Credit messages may be sent to the sender in any suitable manner, for example, by posting a descriptor in the send queue 100 of the receiver containing the size and virtual memory address of the credit message and ringing the send queue doorbell. However, in a preferred embodiment of the present invention, the sender and the receiver use a separate connection from the connection(s) for sending and receiving data for the sending and receiving of credits. Accordingly, since each virtual interface may connect to one remote virtual interface to form one network connection, the sender and the receiver may each include an additional virtual interface for sending and receiving credit messages. In addition, in an alternative embodiment of the invention, a single sender and a single receiver may communicate over multiple data connections. In such an embodiment, the sender and receiver may each include multiple virtual interfaces for the data connections and a single virtual interface for a control connection for the exchange of credit messages. The credit message builder/communicator of the receiver may multiplex credits or credit messages sent over the control connection to the sender. Each credit or credit message may specify the data connection or virtual interface to which it pertains. The credit message reader/processor of the sender may demultiplex the credits and use the credits to control the sending of data over the corresponding data connection. In order to prevent credit message overflow, the credit message reader/processor may maintain a separate credit message buffer for each data connection. In yet another alternative embodiment, the receiver may comprise a server that communicates with a plurality of client senders. In such an embodiment, the receiver may include one virtual interface for sending credits to and receiving credits from each of the remote senders. That is, the number of credit message connections may be equal to the number of remote client senders. Any number of credit message connections and data connections is within the scope of the invention.

Once a credit message is transmitted to the sender, the credit list reader/processor 75 of the sender receives the credit message 82. Receiving a credit message may require the previous posting of a descriptor containing the virtual address and size of a credit message buffer in the receive queue 99 of the sender. Alternatively, as discussed above, credits may be received over a separate connection from the connection for receiving data. The credit list reader/processor 75 may use the credits in the credit message to control the posting of descriptors in the send queue 98. For example, the sender may have a send buffer containing six bytes of data to be sent to the receiver. The credit message 82 from the receiver may contain a first credit of four bytes and a second credit of two bytes, indicating that the descriptors 106 and 107 specify two-byte and four-byte receive buffers, respectively. Accordingly, the credit list reader/processor 75 may post a first descriptor 103 in the send queue 98 containing a pointer pointing to the first byte of the send buffer with a size of four bytes and a second descriptor 102 in the send queue 98 containing a pointer pointing to the fifth byte of the send buffer 68 with a size of two bytes. The I/O device 70 may process the descriptor 103 and transmit a first data packet having four bytes of data to the receiver. The I/O device 70 may process the second descriptor 102 and transmit a second data packet of two bytes of data to the receiver. When the receiver receives the data packets, the receiver processes the descriptor 107, then the descriptor 106, to store the received data packets in four- and two-byte receive buffers, respectively. In this manner, the sender only sends data that the receiver is capable of receiving. As a result, data transmission overflow errors are reduced and transmission efficiency is increased.

In the embodiment illustrated in FIG. 3, the credit list builder/communicator 83 and the credit list reader/processor 75 are preferably implemented in software, e.g., in the VI user agents 91 and 89. In an alternative embodiment, the credit list builder/communicator and the credit list reader/processor may be implemented in hardware, e.g., in hardware of the I/O devices. Implementing the credit list builder/communicator and the credit list reader/processor in the hardware of the I/O devices allows flow control functions to be performed transparently to the communications software of the sender and the receiver.

Figure 3A:
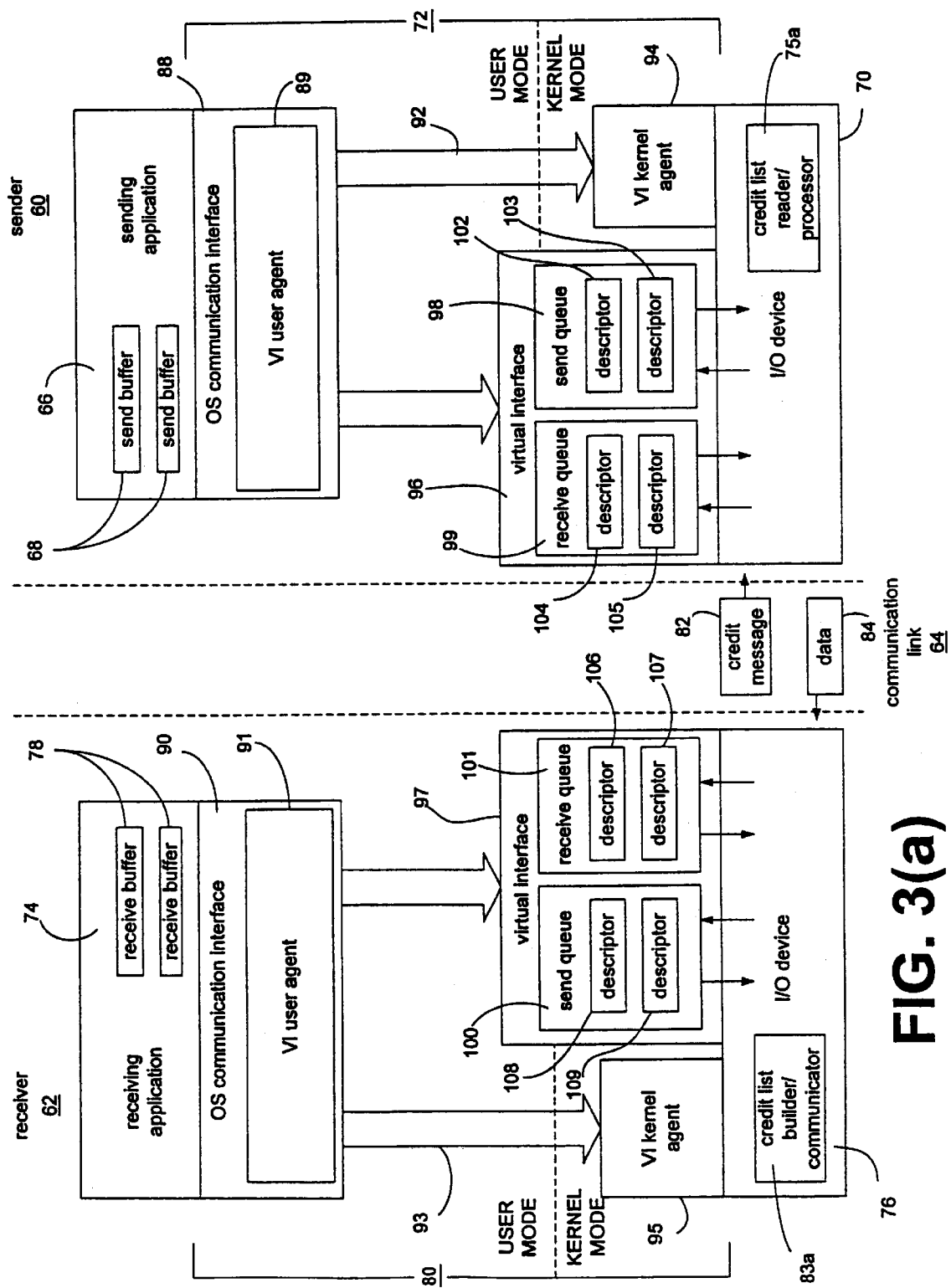
FIG. 3(a) is a detailed block diagram of the sender and the receiver according to an alternative embodiment of the invention.

FIG. 3(*a*) illustrates a detailed block diagram of a sender and a receiver in which the credit list builder/communicator and the credit list reader/processor are implemented in hardware. In the illustrated embodiment, the credit list reader/processor 75a is a hardware component of the I/O device 70 of the sender and the credit list builder/communicator 83a is a hardware component of the I/O device 76 of the receiver. The remaining components in FIG. 3(a) are the same as those illustrated in FIG. 3, and their descriptions are therefore not repeated.

In order to regulate the flow of data from the sender, the credit list builder/communicator 83a of the receiver may generate a list of credits based on descriptors posted in the receive queue 101. The list of credits may be stored in memory of the I/O device 76 or in memory of the host computer in which the I/O device is inserted. The credit list builder/communicator 83a may send the credit list to the sender by instructing the I/O device 76 to send the list directly from the memory location in which the credit list is stored. The credit list builder/communicator 83a may also determine when to communicate new credits to the sender as will be discussed in more detail below.

The credit list reader/processor 75a may receive the credit list and process the credits in order to send data to the receiver. However, unlike the credit list reader/processor 75 illustrated in FIG. 3, rather than posting descriptors in the send queue, the credit list reader/processor 75a may control the sending of data specified by descriptors previously posted in the send queue 98 of the sender so that the size of data packets actually sent to the receiver corresponds to the credits. For example, a descriptor specifying the sending of eleven bytes of data may be located at the head of the send queue 98. The credit list reader/processor 75a may have two credits of five bytes and six bytes. Accordingly, the credit list reader/processor 75a may break the data buffer specified by the descriptor into a first data packet of five bytes and a second data packet of six bytes. Thus, when the credit list reader/processor and the credit list builder/communicator are implemented in hardware, flow control can be achieved transparently to the VI user agents 89 and 91.

Figure 4:
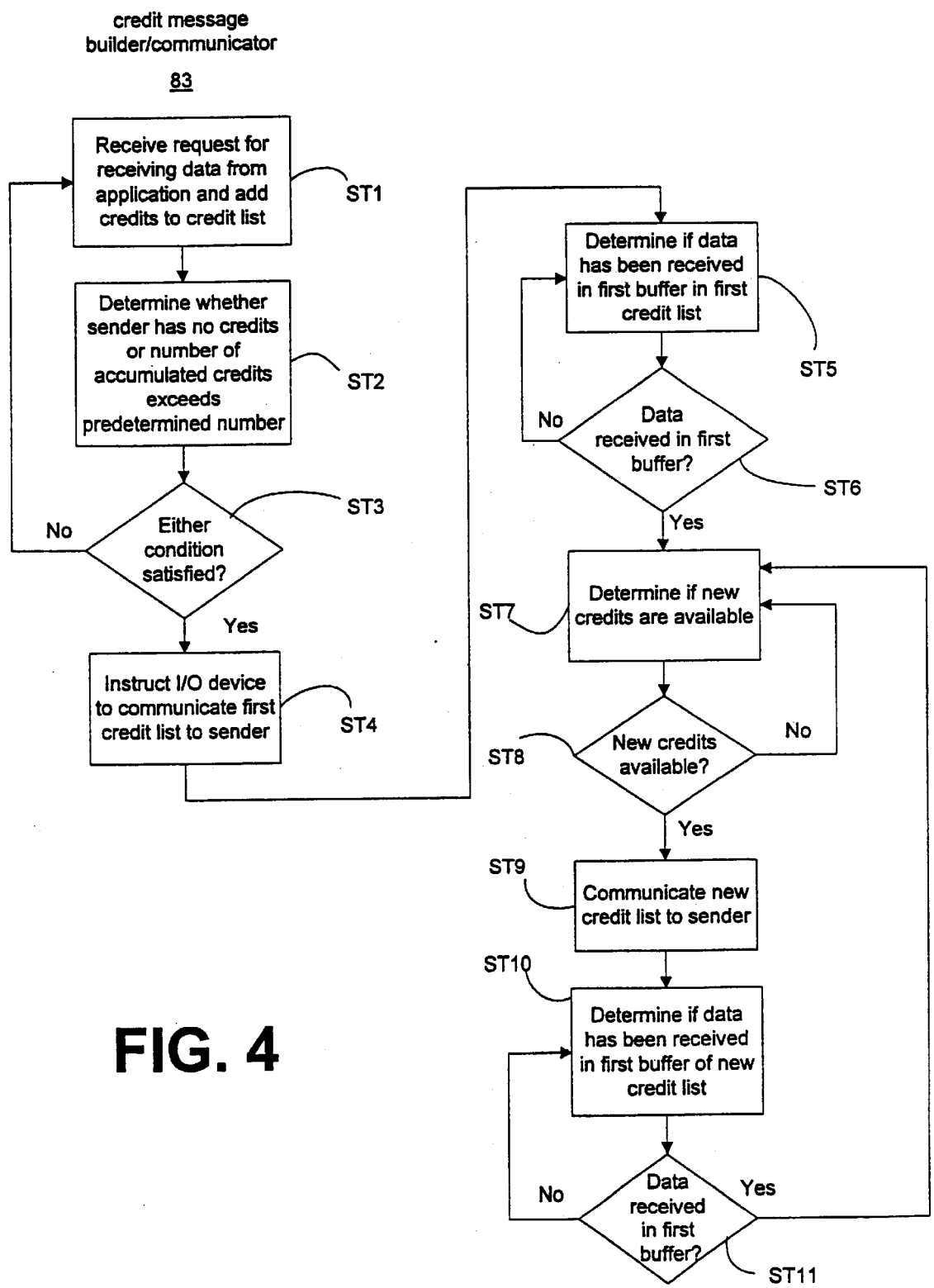
FIG. 4 is a flow chart illustrating steps that may be performed by a credit list builder/communicator of a receiver for determining when to communicate new credits to a sender according to an embodiment of the present invention.

As stated above, the credit list builder/communicator 83 preferably determines when to communicate new credits to the sender. Determining when to provide the sender with new credits may be accomplished in any number of ways. FIG. 4 illustrates exemplary steps which may be performed by the credit list builder/communicator 83 to determine when to communicate new credits to the sender. In step ST1, the credit list builder/communicator 83 may receive requests for receiving data from the receiving application 74. The credit list builder/communicator 83 preferably determines the size of the receive buffer in each request and adds a credit of a corresponding size to a credit list. Step ST1 is preferably executed repeatedly and concurrently with the remaining steps in FIG. 4 to accumulate credits as requests are received from the receiving application 74. In steps ST2 and ST3, the credit list builder/communicator 83 determines whether the number of accumulated credits exceeds a predetermined number or whether the sender has no credits. The predetermined number of credits may be based on a maximum credit message length, which may be determined by the smaller of the network MTU between the sender and the receiver and the size of the buffer posted by the sender to receive credit messages. If either condition is satisfied, the credit list builder/communicator 83 may communicate a first batch or list of credits to the sender. (ST4) For example, the credit list builder/communicator may instruct the I/O device 76 to send a first credit message to the sender, e.g., by posting a descriptor having a pointer to the credit message in the send queue of the control connection of the receiver and ringing the send queue doorbell. In an alternative embodiment, for example, where the sender and receiver communicate using shared memory, the credit list builder/communicator 83 may write the credit list to the control portion of the shared memory if both conditions are satisfied. If neither of the conditions is satisfied, the credit list builder/communicator may continue to accumulate credits. In steps ST5 and ST6, the credit list builder/communicator 83 determines whether data has been received from the sender for the first buffer specified in the first batch of credits communicated to the sender. If data has not been received in the first buffer, the credit list builder/communicator 83 preferably continues checking whether data has been received in the first buffer, i.e., without communicating a new list of credits to the sender. If the credit list builder/communicator 83 determines that data has been received in the first buffer specified in the first credit list, the credit list builder/communicator 83 determines whether new credits are available. (steps ST7 and ST8) If new credits are available, the credit list builder/communicator 83 preferably communicates a new credit list to the sender. (step ST9) For example, the credit list builder/communicator may instruct the I/O device 76 to send a new credit list to the sender containing newly accumulated credits. The newly accumulated credits may be based on receive buffers contained in data receive requests initiated by the receiving application after the previous credit message was sent. If there are no newly accumulated credits, the credit list builder/communicator 83 may continue to check until new credits are available. After the new credit list is communicated to the sender, the credit list builder/communicator 83 determines whether data has been received in the first buffer specified in the new credit list. (steps ST10 and ST11) If data has not been received in the first buffer in the new credit list, the credit list builder/communicator 83 preferably continues checking, i.e., without communicating another new credit list to the sender. If the credit list builder/communicator 83 determines that data has been received in the first buffer in the new credit list, the credit list builder/communicator 83 preferably checks whether new credits are available and instructs the I/O device 76 to send another new credit list to the sender.

The approach illustrated in FIG. 4, in which the receiver communicates a new credit list to the sender when the first buffer specified in a previous credit list is used, increases the number of credits available to the sender at any given time. This approach may be desirable if the sender is rapidly consuming available credits. In an alternative approach, steps ST5, ST6, ST10, and ST11 can be modified so that the credit list builder/communicator 83 determines when the last buffer in a previous credit list is used before communicating a new credit list to the sender. This approach would reduce the number of credit list communications sent by the receiver and the number of credits available to the sender at any given time, Such an approach may be desirable if the sender is not rapidly consuming available credits. In yet another alternative, the credit list builder/communicator 83 may instruct the I/O device of the receiver to communicate new credit lists to the sender when a buffer between the first and last buffers in a previous credit list receives data from the sender.

Figure 5:
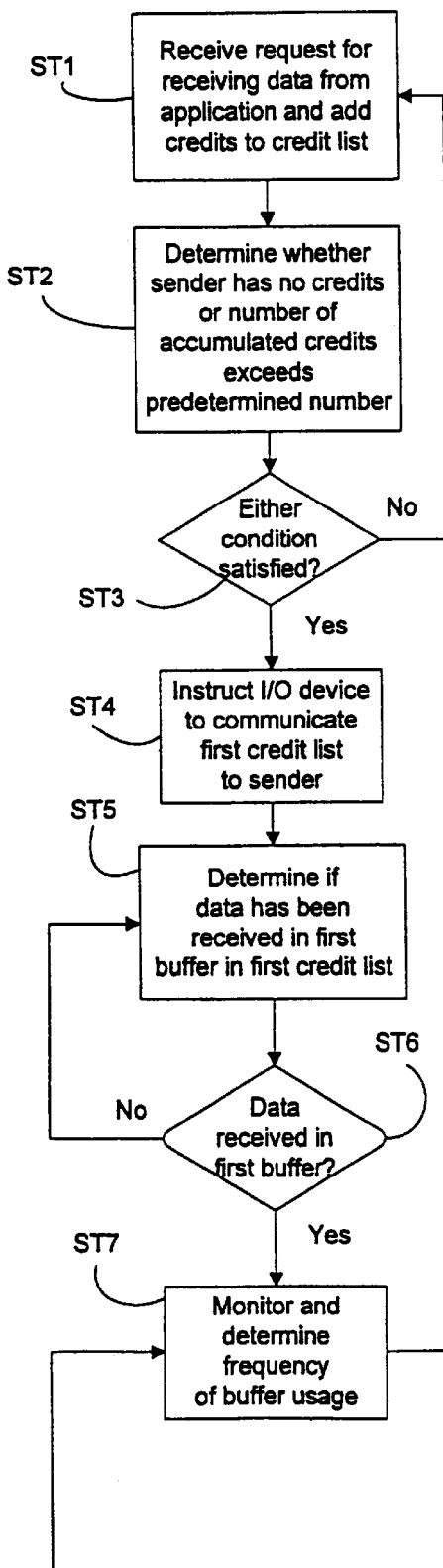
FIG. 5 is a flow chart illustrating exemplary steps that may be performed by a credit list builder/communicator of a receiver for determining when to communicate new credits to a sender according to another embodiment of the present invention.
Figure 5:
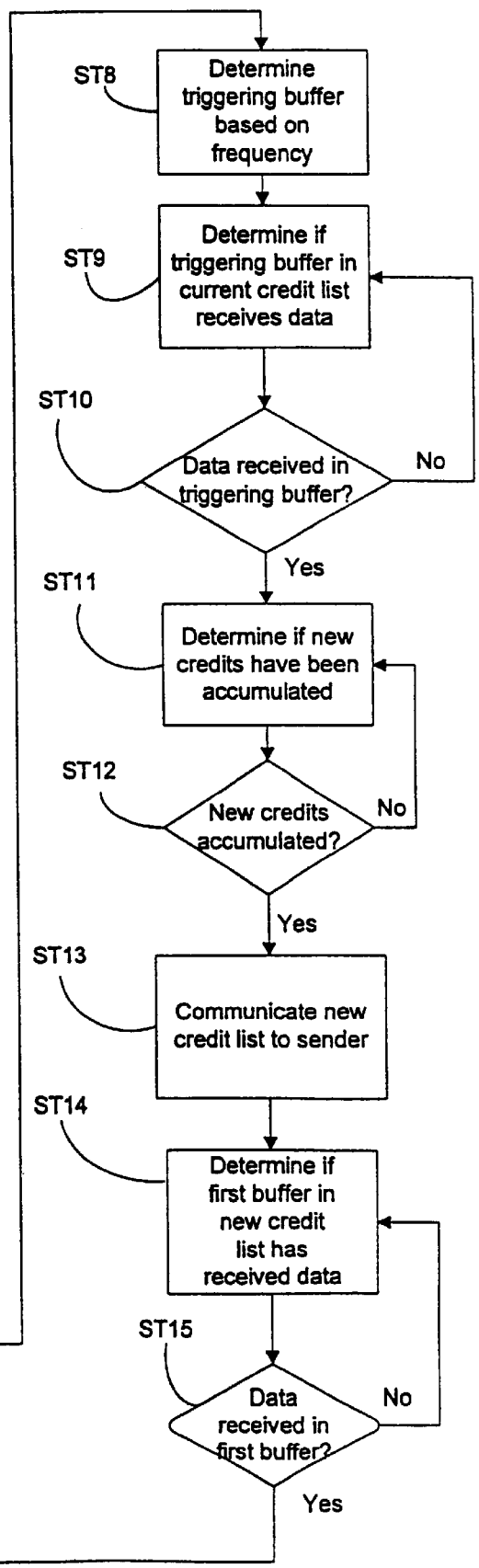

According to another aspect of the invention, the method for determining when to communicate new credits to the sender is adaptable. FIG. 5 illustrates an adaptable approach for determining when to communicate new credits to the sender. Steps ST1–ST6 are the same as steps ST1–ST6 in FIG. 4 and their description is not repeated. In step ST7, after data has been received in a first buffer specified in a first credit list previously communicated to the sender, the credit list builder/communicator 83 determines the frequency at which the buffers are being used by the sender. In step ST8, the credit list builder/communicator 83 determines which buffer in the credit list currently being used by the sender will trigger the sending of a new credit message, based on the frequency. For example, if the sender is rapidly using buffers in the current credit message, a new credit message may be sent when a buffer near the beginning of the current credit message is used. On the other hand, if the sender is slowly consuming the buffers in the current credit message, the credit list builder/communicator 83 may wait until a buffer near the end of the current credit message is used to send the new credit message. In steps ST9 and ST10, the credit list builder/communicator 83 determines if the triggering buffer in the current credit message has received data from the sender. If the triggering buffer has not received data, the credit list builder/communicator 83 preferably continues checking. If the triggering buffer has received data, the credit list builder/communicator 83 may determine if any new credits have been accumulated. (steps ST11 and ST12) If new credits have not been accumulated, the credit list builder/communicator may continue checking. If new credits have been accumulated, the credit list builder/communicator 83 may instruct the I/O device 76 to send a new credit list to the sender. In steps ST14 and ST15, the credit list builder/communicator 83 determines whether data has been received in the first buffer in the new credit list. If data has not been received in the first buffer, the credit list builder/communicator 83 preferably continues checking. If data has been received, the credit list builder/communicator 83 returns to step ST7 to determine the frequency at which the sender is utilizing buffers and determine which buffer in the new credit message will trigger the sending of another new credit list. In an alternative arrangement, step ST7 may be executed continuously so that the triggering buffer can be updated continuously. In this manner, the number of credit messages and credits made available to the sender is controlled based on the rate at which the sender is using credits. In another alternative arrangement, the times at which buffers in a first credit message are used may be input to an adaptive-predictive filter. The adaptive-predictive filter may predict when the sender will most likely need a new list of credits.

The present invention is not limited to utilizing a triggering buffer to determine when to communicate a new credit list to the sender. For example, in an alternative embodiment, steps ST9 and ST10 in FIG. 5 may be replace by steps for determining a time, e.g., in milliseconds, for communicating a new credit list to the sender. In such an embodiment, the credit list builder/communicator 83 may monitor the frequency at which the sender consumes credits and, based on the frequency, determine to communicate new credits after a predetermined time period elapses. Any method for adaptively determining when to communicate new credits to the sender is within the scope of the invention.

In another alternative embodiment, the credit list builder/communicator 83 may implement quality of service functions by regulating the rate at which credits are communicated to the sender. For example, the receiver may comprise a server that provides services to a plurality of client senders. The receiver may prevent any one of the clients from exceeding a predetermined maximum allowable bandwidth by not sending credits to the client when doing so would allow the client to exceed the maximum allowable bandwidth. By preventing clients from exceeding a maximum allowable bandwidth using credits, the server can guarantee a certain quality of service to all clients. For example, since none of the clients can exceed the maximum allowable bandwidth, the processing load on the server is determined by the number of clients and the maximum allowable bandwidth. If the maximum allowable bandwidth is set somewhat lower than the bandwidth that the server is capable of servicing for a given connection, the server can service a greater number of clients with less hardware. In contrast, without a maximum bandwidth limitation, in order to guarantee service to a given number of clients, the server must contain sufficient resources to handle bursts of communications from the clients in excess of the average bandwidth. Thus, the credit-based methods and systems for regulating flow between a sender and the receiver can be used to facilitate server resource planning.

Figure 6:
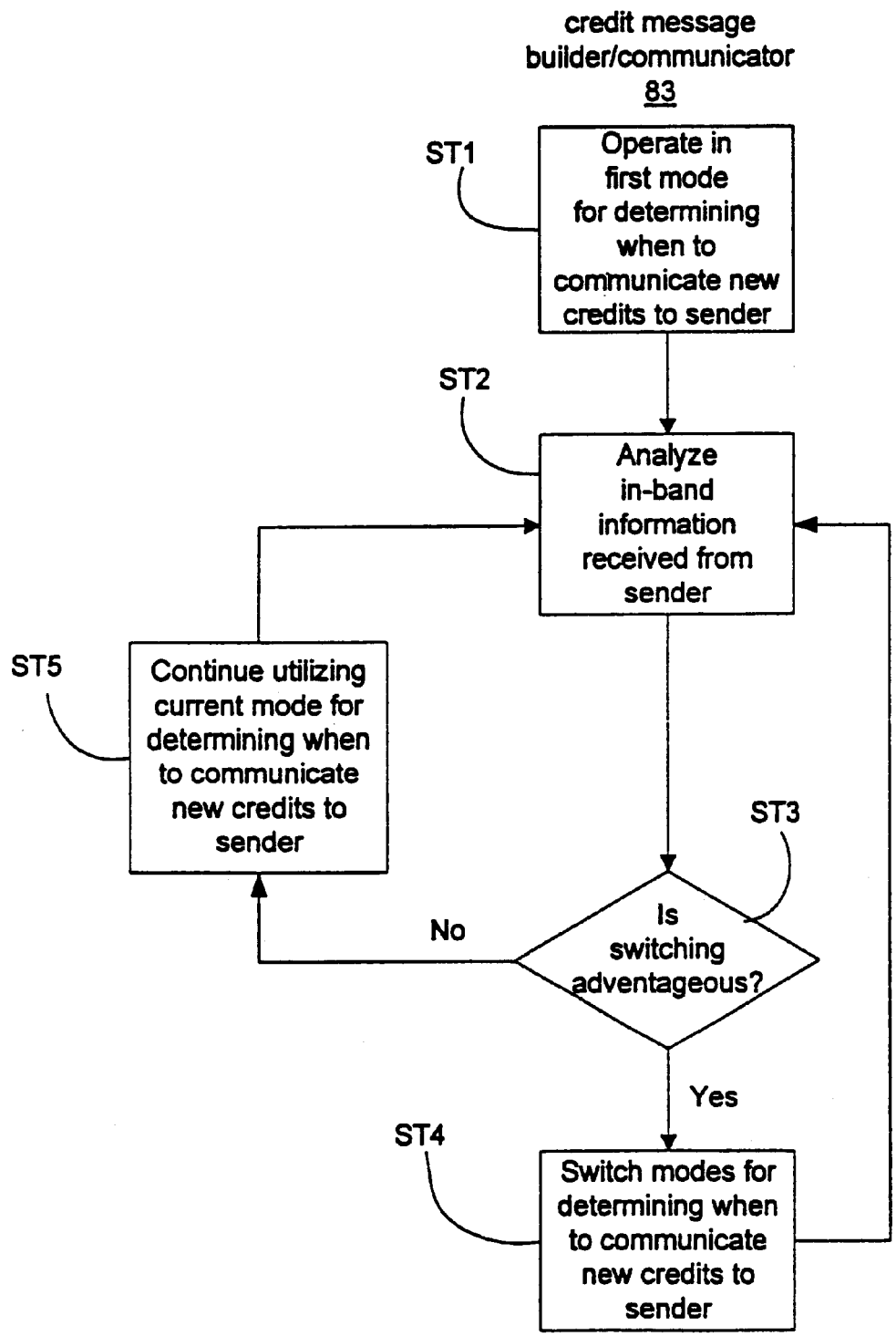
FIG. 6 is a flow chart illustrating exemplary steps that may be performed by a credit list builder/communicator of a receiver for determining whether to switch from a first mode to a second mode for determining when to communicate new credits to a sender according to an embodiment of the present invention.

According to another aspect of the invention, the sender may transmit in-band information to the receiver along with the data packets. The in-band information may include the cumulative amount of data remaining to be sent by the sender. The credit list builder/communicator 83 may utilize this information to switch between one or more of the approaches previously described for determining when to communicate new credits to the sender. FIG. 6 illustrates an exemplary approach for switching between modes for determining when to communicate new credits to the sender. In step ST1, the credit list builder/communicator 83 operates in a first mode for determining when to communicate new credits to the sender. The first mode may comprise the steps illustrated in FIG. 4 for sending new credit lists when a first buffer in a previous credit list triggers the sending of a new credit list. In step ST2, the credit list builder/communicator 83 analyzes the in-band data transmitted from the sender. The in-band data may include any information for assisting the credit list builder/communicator 83 in determining when to communicate new credits to the sender. For example, the in-band data may include the amount of data remaining to be sent by the sender.

In step ST3, the credit list builder/communicator 83 may determine whether switching would increase performance, e.g., by analyzing the amount of data remaining to be sent, the number of credits remaining, and/or frequency of buffer usage. For example, the credit list builder/communicator 83 may compare the monitored information to a threshold value or a set of threshold values to determine whether to switch modes. If the analysis indicates that the rate at which credits are currently being communicated to the sender is too fast, the credit list builder/communicator 83 may switch to a second mode for determining when to communicate new credits to the sender to slow the rate at which credits are communicated to the sender. (step ST4) On the other hand, if the analysis indicates that the communication of the credits is too slow, the credit list builder/communicator 83 may switch to a third mode for determining when to communicate new credits to the sender to increase the rate of communication of credits to the sender. If switching modes would not increase performance the credit list builder/communicator 83 may continue operating in the current mode (step ST5) and return to checking the in-band information. The in-band information may also be used as an input to an adaptive-predictive filter to adaptively determine when to communicate new credits to the sender. By using in-band information from the sender to determine when to send new credit messages, the I/O performance of the sender and receiver may be further improved. For instance, the in-band information may be utilized to reduce the number of mode switches when the data rate is highly variable.

Figure 7:
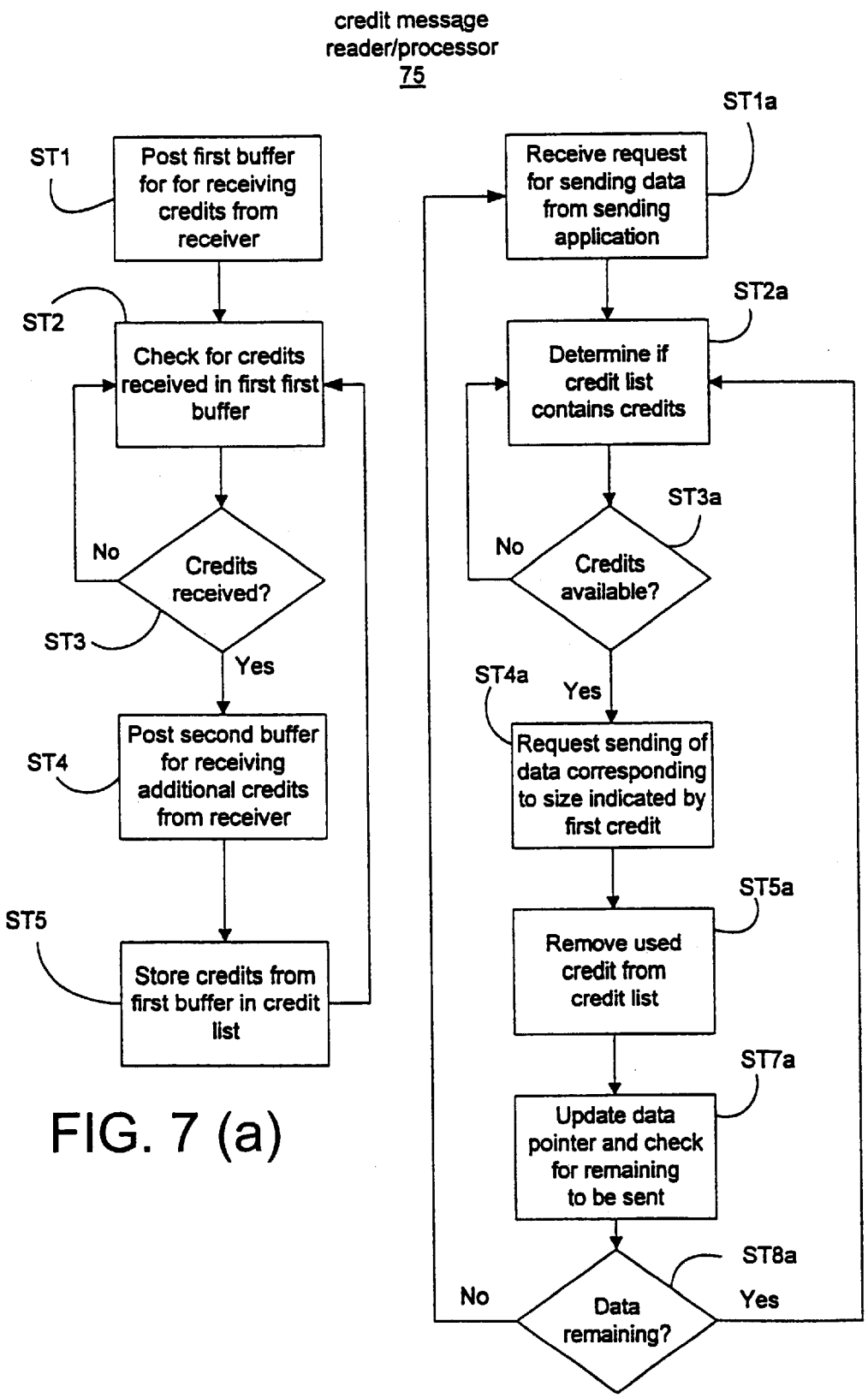
FIGS. 7(a) and 7(b) are flow charts illustrating exemplary steps that may be performed by a credit list reader/processor of a sender for reading and processing credits according to an embodiment of the present invention.

FIGS. 7(*a*) and 7(*b*) illustrate steps that may be performed by the credit list reader/processor 75 according to an embodiment of the present invention. FIG. 7(a) illustrates exemplary steps that may be performed by the credit list reader/processor 75 for receiving credits from the receiver and posting buffers to receive new credits. FIG. 7(b) illustrates exemplary steps that may be performed by the credit list reader/processor 75 for processing credits to send data to the receiver. The steps illustrated in FIG. 7(a) may be executed concurrently with the steps illustrated in FIG. 7(b). In FIG. 7(a), the credit list reader/processor 75 posts a first buffer for receiving credits and notifies the I/O device 70 of the posting. (step ST1) For example, the credit list reader/processor may write the virtual address of a descriptor pointing to the buffer for receiving credit messages to the receive queue of the virtual interface of the sender for sending and receiving credit messages and ring the associated doorbell. Alternatively, where credits are communicated to the sender using shared memory or RDMA write operations, the sender may ensure that buffer space in memory exists for receiving credits. The buffer is preferably posted before a connection is established between the receiver and the sender. In steps ST2 and ST3, the credit list reader/processor checks for credits transmitted from the receiver. Checking whether credits have been received may include reading the memory location or locations reserved for receiving credits. If credits have not been received, the credit list reader/processor may continue checking or waiting to be notified of the reception of credits. If credits have been received, the credit list reader/processor 75 may post a second buffer for receiving new credits from the receiver (ST4). Once the second buffer has been posted, the credit list reader/processor may store the credits from the first buffer in a credit list and returns to step ST2 to check for credits in the buffer posted in step ST4. (step ST5)

In FIG. 7(b), the credit list reader/processor 75 receives a request for sending data originating from the sending application. (step ST1a) The request may comprise a "Winsock" send( ) function including a buffer virtual address and a buffer size. In steps ST2a and ST3a, the credit list reader/processor 75 determines if the credit list contains any credits. If the credit list does not contain any credits, the credit list reader/processor 75 preferably continues checking, i.e., without requesting sending of the data. If the credit list contains credits, the credit message receive/processor 75 may request the sending of data corresponding to the size indicated by the first credit. (step ST4a) The credit list reader/processor preferably then removes the first credit from the credit list. (step ST5a) The credit list reader/processor 75 may then update a data pointer pointing to the data to be sent and check whether any data remains to be sent. (steps ST6a and ST7a). If data remains to be sent, the credit list reader/processor 75 may return to step ST2a to use the next credit in the credit list if additional credits are available. If no data remains to be sent, the credit list reader/processor may return to step ST1 a to receive the next request for sending data from the sending application.

By only sending data when credits are available, the credit list reader/processor reduces the likelihood of data transmission overflow conditions. In addition, because the credit list reader/processor 75 posts a new buffer for receiving credits before using newly-received credits, the credit list reader/processor 75 allows the credit list builder/communicator 83 of the receiver to maintain that the sender has a buffer available for receiving credits if the receiver receives data corresponding to the first credit in a new credit list. Thus, embodiments of the present invention may also reduce the likelihood of data transmission overflow conditions in transmitting credit messages from the receiver to the sender.

The credit list reader/processor according to the present invention is not limited to the embodiments illustrated in FIGS. 7(a) and 7(b). For example, as stated above, the credit list reader/processor 75 may control the transmission of in-band data from the sender to the receiver. The in-band data may be transmitted along with data packets from the sender to the receiver. The in-band data may include any data to assist the receiver in determining when to transmit credit messages to the sender. For example, the in-band information may include the amount of data remaining to be sent by the sender.

Figure 8:
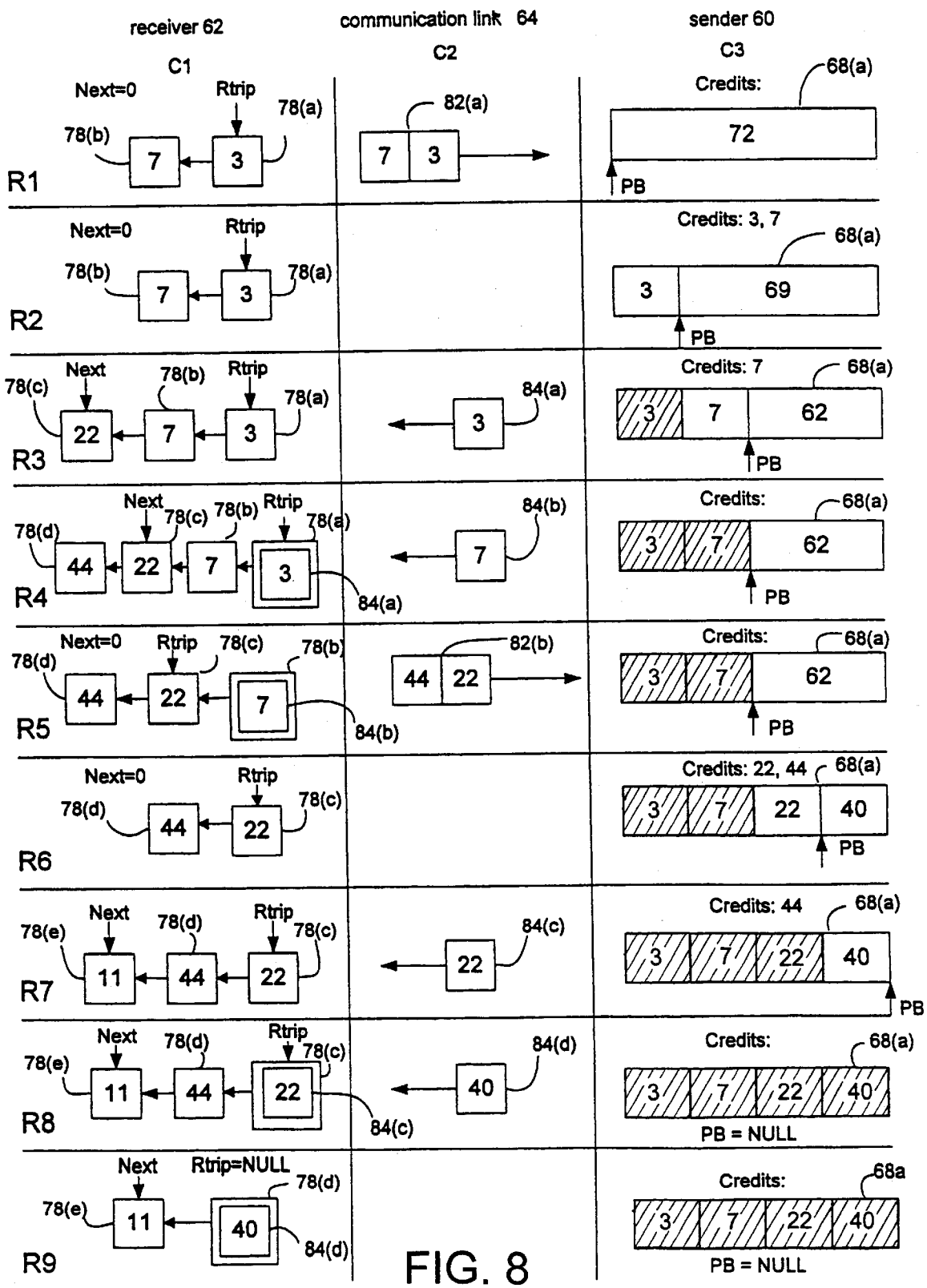
FIG. 8 is a flow diagram illustrating an example of the transfer of credits to and the use of credits by a sender according to an embodiment of the present invention.

FIG. 8 is a flow diagram illustrating an example of the transfer of data and credit messages between the sender 60 and the receiver 62. Each row in the flow diagram indicates status information and action taken by the sender 60 and the receiver 62. The first column C1 in the diagram represents the receiver 62, including the credit list builder/communicator 83, the second column C2 represents the communication link 64, and the third column C3 represents the sender 60 including the credit list reader/processor 75. In row R1, column C3, the sender 60 has a send buffer 68(a) of seventy-two bytes to send to the receiver 62. The send buffer 68(a) may have been communicated to the credit list reader/processor 75 by the sending application of the sender. PB is a pointer to the first byte of the send buffer 68(a). The sender initially has zero credits. In row R1, column C1, the receiver has two available receive buffers 78(a) and 78(b) of size three bytes and seven bytes, respectively. In row R1, column C2, the receiver 62 sends a credit message 82(a) to the sender 60 indicating the size of the buffers 78(a) and 78(b). The sender maintains two pointers, Rtrip and Next. Rtrip points to the first buffer indicated in a credit message sent to the sender. The pointer Next points to the first receive buffer not communicated to the sender in a credit message. Since there are no buffer sizes that have not been transmitted to the sender in row R1, the pointer Next equals zero.

The pointer Rtrip may be used to indicate to the sender when new credit message buffers are available at the sender for receiving credit messages. For example, described above, if data is received in a buffer in a list of credits previously communicated to the sender, the receiver can assume that the sender has posted a new buffer for receiving credit messages. Accordingly, when data is received in the first buffer, the credit message sent to the sender, the pointer Rtrip may be set to NULL. (see row R9, column C1)

In row R2, column C3, the credit list reader/processor 75 of the sender receives the credit message 82(a) and adds credits of three and seven to the credit list. The credit list reader/processor 75 posts a first descriptor to the send queue of the sender to send the first three bytes of the send buffer 68(a) and updates the buffer pointer PB to point to the next byte to be sent.

In row R3, column C2, the sender sends a data packet 84(a) containing the first three bytes of the send buffer 68(a) to the receiver. In row R3, column C3, the credit list reader/processor 75 removes the used credit of three from the credit list, posts a descriptor in the send queue to send the next seven bytes of the send buffer 68(a) and updates the buffer pointer PB. The shaded bytes in the send buffer 68(a) indicate data that has been sent to the receiver. Thus, in row R3, column C3, the first three bytes of the send buffer 68(a) have been sent. In row R3, column C1, the credit list builder/communicator 83 has received a request for receiving data in a new buffer 78(c) of size twenty-two. Since this buffer 78(c) has not been communicated to the sender, the credit list builder/communicator preferably updates the pointer Next to point to this buffer.

In row R4, column C2, the sender sends a data packet 84(*b*) containing the next seven bytes of the send buffer 68(*a*). In row R4, column C3, the sender credit list reader/processor 75 preferably removes the used credit of seven from the credit list. In this state, the sender has no credits and preferably does not send any more data until receiving more credits from the receiver. In row R4, column C1, the receiver receives the data packet 84(*a*) into the receive buffer 78(*a*). The credit list builder/communicator 83 has received a request for receiving data into a new buffer 78(*d*) of size forty-four.

In row R5, column C3, the sender is idle because it has no credits. In row R5, column C2, the receiver sends a credit message 82(*b*) containing credits of twenty-two and forty-four to the sender. In row R5, column C1, the pointer Rtrip is updated to point to the receive buffer 78(*c*) corresponding to the first credit in the new credit message 82(*b*). The credit list builder/communicator 83 sets the pointer Next to zero because there are no credits that have not been transmitted to the sender. The buffer 78(*a*) has been removed from the buffers available for receiving data because the descriptor for that buffer has been processed. The receive buffer 78(*b*) receives the data packet 84(*b*).

In row R6, column C3, the sender receives the credits twenty-two and forty-four. The credit list reader/processor 75 posts a descriptor in the send queue to send the next twenty-two bytes of the send buffer 68(*a*). The credit list reader/processor 75 updates the buffer pointer PB. In row R6, column C1, the receiver removes the buffer 78(*b*) from the list of buffers available for receiving data since it previously received data.

In row R7, column C2, the sender sends a data packet 84(*c*) containing the next twenty-two bytes of the send buffer 68(*a*). In row R7, column C3, the credit list reader/processor 75 removes the used credit of twenty-two from the credit list. The credit list reader/processor 75 posts a descriptor in the send queue to send the next forty bytes of data to the receiver and updates the buffer pointer PB. In row R7, column C1, the credit list builder/communicator 83 receives a request for receiving data into a new buffer 78(*e*) of size eleven. The credit list builder/communicator 83 updates the pointer Next to point to the new buffer 78(*e*).

In row R8, column C1, the receiver receives the data packet 84(*c*) in the receive buffer 78(*c*). In row R8, column C2, the sender sends a data packet 84(*d*) containing the last forty bytes of the receive buffer 68(*a*) to the receiver. In row R8, column C3, the credit list reader/processor removes the used credit of forty-four from the credit list. The use of a forty-four-byte credit to send a buffer of forty bytes illustrates an acceptable, but inefficient use of a credit. Since all of the data has been sent, the buffer pointer PB is set to NULL.

In row R9, column C1, the receiver receives the data packet 84(*d*) in the send buffer 78(*d*). The receive buffer 78(*d*) is removed from the set of receive buffers available to receive data since its descriptor has been processed. The pointer Rtrip is set to NULL to indicate the availability of a credit message buffer at the sender. Because the receiver sends a list of credits to the sender, the sender sends data to the receiver based on the size and order of the credits, and the receiver receives data into buffers according to the size and order of the credits, reliable flow control between the sender and the receiver can be achieved with reduced copying of data.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. On a receiver in a credit-based communications environment, wherein the receiver sends lists of credits to a sender, and wherein the sender uses credits in conjunction with sending data to the receiver, a method for deciding when to send a list of credits to the sender, the method comprising:

building a first list of one or more credits, the credits indicative of one or more receive buffers in a first set;

sending the first list of credits to the sender;

receiving data from the sender into one or more receive buffers in the first set;

collecting information about the receiving of data from the sender into one or more receive buffers in the first set, collected information comprising information in the set: frequency of use of receive buffers, times of use of receive buffers;

building a second list of one or more credits, the credits indicative of one or more receive buffers in a second set;

deciding on a time for sending the second list of credits to the sender, wherein the deciding is based, at least in part, on the collected information; and sending the second list of credits to the sender.

2. The method of claim 1 wherein the deciding comprises applying an adaptive-predictive filter to the collected information.

3. The method of claim 1 wherein deciding comprises setting a timer and wherein the time for sending is related to an expiration of the timer.

4. The method of claim 1 wherein deciding comprises choosing a trigger receive buffer and wherein the time for sending is related to receiving data from the sender into the chosen trigger receive buffer.

5. The method of claim 1 further comprising:

sending a third list of credits to the sender between the sending of the first and the second lists of credits.

6. A computer-readable medium containing instructions for performing, on a receiver in a credit-based communications environment, wherein the receiver sends lists of credits to a sender, and wherein the sender uses credits in conjunction with sending data to the receiver, a method for deciding when to send a list of credits to the sender, the method comprising:

building a first list of one or more credits, the credits indicative of one or more receive buffers in a first set;

sending the first list of credits to the sender;

receiving data from the sender into one or more receive buffers in the first set;

collecting information about the receiving of data from the sender into one or more receive buffers in the first set, collected information comprising information in the set: frequency of use of receive buffers, times of use of receive buffers;

building a second list of one or more credits, the credits indicative of one or more receive buffers in a second set;

deciding on a time for sending the second list of credits to the sender, wherein the deciding is based, at least in part, on the collected information; and sending the second list of credits to the sender.

7. On a receiver in a credit-based communications environment, wherein the receiver sends lists of credits to a sender, and wherein the sender uses credits in conjunction with sending data to the receiver, a system for deciding when to send a list of credits to the sender, the system comprising:

a credit list builder for building lists of one or more credits indicative of one or more receive buffers;

a credit list sender for sending lists of credits to the sender;

a data receiver for receiving data from the sender into one or more receive buffers;

an information collector for collecting information about receiving data from the sender into one or more receive buffers, collected information comprising information in the set: frequency of use of receive buffers, times of use of receive buffers; and a decider for deciding on a time for sending a list of credits to the sender, wherein the deciding is based, at least in part, on the collected information.

8. The system of claim 7 further comprising:

an adaptive-predictive filter for analyzing the collected information.

9. The system of claim 7 further comprising:

a timer and wherein the time for sending is related to an expiration of the timer.

10. A computer-readable medium containing instructions for providing, on a receiver in a credit-based communications environment, wherein the receiver sends lists of credits to a sender, and wherein the sender uses credits in conjunction with sending data to the receiver, a system for deciding when to send a list of credits to the sender, the system comprising:

a credit list builder for building lists of one or more credits indicative of one or more receive buffers;

a credit list sender for sending lists of credits to the sender;

a data receiver for receiving data from the sender into one or more receive buffers;

an information collector for collecting information about receiving data from the sender into one or more receive buffers, collected information comprising information in the set: frequency of use of receive buffers, times of use of receive buffers; and a decider for deciding on a time for sending a list of credits to the sender, wherein the deciding is based, at least in part, on the collected information.

11. On a receiver in a credit-based communications environment, wherein the receiver sends lists of credits to a sender, and wherein the sender uses credits in conjunction with sending data to the receiver, a method for controlling a flow of lists of credits to the sender, the method comprising:

building a first list of one or more credits, the credits indicative of one or more receive buffers in a first set;

sending the first list of credits to the sender;

building a second list of one or more credits, the credits indicative of one or more receive buffers in a second set;

sending the second list of credits to the sender;

building a third list of one or more credits, the credits indicative of one or more receive buffers in a third set;

receiving data from the sender into one or more receive buffers in the first set;

receiving data from the sender into one or more receive buffers in the second set; and when data are received into one or more receive buffers in the second set, sending the third list of credits to the sender.

12. A computer-readable medium containing instructions for performing, on a receiver in a credit-based communications environment, wherein the receiver sends lists of credits to a sender, and wherein the sender uses credits in conjunction with sending data to the receiver, a method for controlling a flow of lists of credits to the sender, the method comprising:

building a first list of one or more credits, the credits indicative of one or more receive buffers in a first set;

sending the first list of credits to the sender;

building a second list of one or more credits, the credits indicative of one or more receive buffers in a second set;

sending the second list of credits to the sender;

building a third list of one or more credits, the credits indicative of one or more receive buffers in a third set;

receiving data from the sender into one or more receive buffers in the first set;

receiving data from the sender into one or more receive buffers in the second set; and when data are received into one or more receive buffers in the second set, sending the third list of credits to the sender.

* * * * *

UNITED STATES PATENT AND TRADEMARK OFFICE
CERTIFICATE OF CORRECTION

PATENT NO. : 6,594,701 B1  Page 1 of 1
DATED : July 15, 2003
INVENTOR(S) : Forin It is certified that error appears in the above-identified patent and that said Letters Patent is hereby corrected as shown below:

<u>Title page,</u>
Item [56], References Cited, OTHER PUBLICATIONS, "Flow-Contrlled" should read -- Flow-Controlled --; and "SHRIMO" should read -- SHRIMP --.

<u>Column 1,</u>
Line 32, "techniques, flow" should read -- techniques, data flow --.

Signed and Sealed this

Thirteenth Day of April, 2004

JON W. DUDAS
*Acting Director of the United States Patent and Trademark Office*